(12) United States Patent
Wu et al.

(10) Patent No.: US 11,928,152 B2
(45) Date of Patent: Mar. 12, 2024

(54) SEARCH RESULT DISPLAY METHOD, READABLE MEDIUM, AND TERMINAL DEVICE

(71) Applicant: BEIJING BYTEDANCE NETWORK TECHNOLOGY CO., LTD., Beijing (CN)

(72) Inventors: Yiwen Wu, Beijing (CN); Cheng Li, Beijing (CN)

(73) Assignee: BEIJING BYTEDANCE NETWORK TECHNOLOGY CO., LTD. (CN)

(*) Notice: Subject to any disclaimer, the term of this patent is extended or adjusted under 35 U.S.C. 154(b) by 0 days.

(21) Appl. No.: 18/060,543

(22) Filed: Nov. 30, 2022

(65) Prior Publication Data
US 2023/0093621 A1 Mar. 23, 2023

Related U.S. Application Data

(63) Continuation of application No. PCT/CN2021/113162, filed on Aug. 18, 2021.

(30) Foreign Application Priority Data

Aug. 27, 2020 (CN) .......................... 202010879294.5

(51) Int. Cl.
*G06F 16/738* (2019.01)
*G06F 16/432* (2019.01)
*G06F 16/783* (2019.01)

(52) U.S. Cl.
CPC .......... *G06F 16/739* (2019.01); *G06F 16/434* (2019.01); *G06F 16/7837* (2019.01)

(58) Field of Classification Search
CPC ... G06F 16/739; G06F 16/434; G06F 16/7837
See application file for complete search history.

(56) References Cited

U.S. PATENT DOCUMENTS

| 2016/0011762 | A1 | 1/2016 | Hogben et al. |
| 2016/0055379 | A1 | 2/2016 | Svendsen |
| 2019/0005699 | A1* | 1/2019 | Anderson ............... G06T 7/251 |

(Continued)

FOREIGN PATENT DOCUMENTS

| CN | 106909538 A | 6/2017 |
| CN | 108932253 A | 12/2018 |

(Continued)

OTHER PUBLICATIONS

Perino, M. (Apr. 24, 2020). How to search for filters for your Instagram story and save them to your camera. Business Insider. https://www.businessinsider.in/tech/news/how-to-search-for-filters-for-your-instagram-story-and-save-them-to-your-camera/articleshow/75338939.cms (Year: 2020).*

(Continued)

*Primary Examiner* — William Spieler

(57) ABSTRACT

Provided are a search result presentation method, a readable medium and a terminal device. The search result presentation method includes steps described below. In response to a search instruction for a target entity object, at least one multimedia resource for presenting the use effect of the target entity object is acquired, where the at least one multimedia resource is obtained based on multimedia content corresponding to the target entity object; and the at least one multimedia resource is presented.

18 Claims, 11 Drawing Sheets

(56) References Cited

U.S. PATENT DOCUMENTS

| | | | |
|---|---|---|---|
| 2019/0384789 A1 | 12/2019 | Lee et al. | |
| 2020/0042862 A1* | 2/2020 | Perone | G06N 3/04 |
| 2020/0150765 A1* | 5/2020 | Saboune | A63F 13/285 |

FOREIGN PATENT DOCUMENTS

| | | | |
|---|---|---|---|
| CN | 109189987 A | 1/2019 |
| CN | 109729426 A | 5/2019 |
| CN | 109996091 A | 7/2019 |
| CN | 110019933 A | 7/2019 |
| CN | 110121093 A | 8/2019 |
| CN | 110602554 A | 12/2019 |
| CN | 110856037 A | 2/2020 |
| CN | 110909205 A | 3/2020 |
| CN | 107071542 B | 7/2020 |
| CN | 112015926 A | 12/2020 |
| JP | 2006048605 A | 2/2006 |

OTHER PUBLICATIONS

Feldman, B. (Jan. 18, 2020). Why Instagram Makes Its Filters So Hard to Find. Intelligencer. https://nymag.com/intelligencer/2020/01/why-you-cant-search-for-instagrams-character-filters.html (Year: 2020).*

Search Report dated Nov. 17, 2021 for PCT Application No. PCT/CN2021/113162, English Translation (5 pages).

First Office Action dated Jun. 24, 2021 in CN Appl. No. 202010879294.5, English translation (19 pages).

Second Office Action dated Aug. 27, 2021 in CN Appl. No. 202010879294.5, English translation (24 pages).

Third Office Action dated Nov. 17, 2021 in CN Appl. No. 202010879294.5, English translation (24 pages).

European Search Report dated Oct. 31, 2023 in European Application No. 21860227.4.

Anonymous, "BMW augmented reality," Oct. 3, 2007, XP093094329, <URL:https://www.youtube.com/watch?v=P9KPJIA5yds> [retrieved on Oct. 24, 2023].

* cited by examiner

SEARCH RESULT DISPLAY METHOD, READABLE MEDIUM, AND TERMINAL DEVICE

CROSS REFERENCE TO RELATED APPLICATION(S)

This is continuation of International Patent Application No. PCT/CN2021/113162, filed on Aug. 18, 2021, which is based on and claims priority to Chinese Patent Application No. 202010879294.5 filed with the China National Intellectual Property Administration (CNIPA) on Aug. 27, 2020, the disclosure of which is incorporated herein by reference in its entirety.

TECHNICAL FIELD

The present disclosure relates to the field of electronic and information technology, for example, to a search result presentation method and apparatus, a readable medium and a terminal device.

BACKGROUND

With the continuous development of terminal technology and image processing technology, when a user shoots a video through a terminal device, various types of processing can be performed on the video. For example, subtitles and background music can be added to the video, or special effects, props and the like can be used in the video. When selecting a target effect object that the user wants to use, the user can search for a video using the target effect object as reference. After the user gives a search instruction, the search result seen by the user is usually the video cover of a video. Since the video cover is generally generated randomly, the user cannot acquire effective information from the video cover, so that the effectiveness of search is relatively low. In addition, the user needs to watch a complete video to understand the actual effect of target processing, the process of which consumes data traffic.

SUMMARY

The present disclosure provides a search result presentation method. The method includes steps described below.

In response to a search instruction for a target entity object, at least one multimedia resource for presenting the use effect of the target entity object is acquired, where the at least one multimedia resource is obtained based on multimedia content corresponding to the target entity object.

The at least one multimedia resource is presented.

The present disclosure provides a search result presentation method. The method includes steps described below.

A search instruction for a target entity object is received, and multimedia content corresponding to the target entity object is determined.

Search result information is determined according to the multimedia content corresponding to the target entity object, where the search result information includes: at least one multimedia resource for presenting the use effect of the target entity object, at least one group of multimedia data or at least one piece of resource indication information, where the at least one group of multimedia data is image frame data using a tag of the target entity object in the multimedia content, and the at least one piece of resource indication information is used for indicating a clip where the target entity object appears in the multimedia content.

The search result information is sent to a terminal device.

The present disclosure provides a search result presentation apparatus. The apparatus includes an acquisition module and a presentation module.

The acquisition module is configured to, in response to a search instruction for a target entity object, acquire at least one multimedia resource for presenting the use effect of the target entity object, where the at least one multimedia resource is obtained based on multimedia content corresponding to the target entity object.

The presentation module is configured to present the at least one multimedia resource.

The present disclosure provides a search result presentation apparatus. The apparatus includes a reception module, a determination module and a sending module.

The reception module is configured to receive a search instruction for a target entity object, and determine multimedia content corresponding to the target entity object.

The determination module is configured to determine search result information according to the multimedia content corresponding to the target entity object, where the search result information includes: at least one multimedia resource for presenting the use effect of the target entity object, at least one group of multimedia data or at least one piece of resource indication information, where the at least one group of multimedia data is image frame data using a tag of the target entity object in the multimedia content, and the at least one piece of resource indication information is used for indicating a clip where the target entity object appears in the multimedia content.

The sending module is configured to send the search result information to a terminal device.

The present disclosure provides a computer-readable medium configured to store a computer program which, when executed by a processing apparatus, implements the first method of the present disclosure.

The present disclosure provides a terminal device. The terminal device includes a storage apparatus and a processing apparatus.

The storage apparatus is configured to store a computer program.

The processing apparatus is configured to execute the computer program in the storage apparatus to implement the first method of the present disclosure.

The present disclosure provides a computer-readable medium configured to store a computer program which, when executed by a processing apparatus, implements the second method of the present disclosure.

The present disclosure provides a terminal device. The terminal device includes a storage apparatus and a processing apparatus.

The storage apparatus is configured to store a computer program.

The processing apparatus is configured to execute the computer program in the storage apparatus to implement the second method of the present disclosure.

DETAILED DESCRIPTION

Embodiments of the present disclosure are described hereinafter with reference to the drawings. The drawings illustrate some embodiments of the present disclosure, but the present disclosure may be implemented in various manners and should not be limited to the embodiments set forth herein. Conversely, these embodiments are provided for the understanding of the present disclosure. The drawings and embodiments of the present disclosure are merely for illustrative purposes and are not intended to limit the scope of the present disclosure.

The various steps recited in method embodiments of the present disclosure may be performed in a different order and/or in parallel. Additionally, the method embodiments may include additional steps and/or omit the execution of illustrated steps. The scope of the present disclosure is not limited in this respect.

As used herein, the term "include" and variations thereof are intended to be inclusive, that is, "including, but not limited to". The term "based on" is "at least partially based on". The term "an embodiment" refers to "at least one embodiment"; the term "another embodiment" refers to "at least another embodiment"; and the term "some embodiments" refers to "at least some embodiments". Related definitions of other terms are given in the description hereinafter.

Concepts such as "first" and "second" in the present disclosure are merely intended to distinguish one from another apparatus, module or unit and are not intended to limit the order or interrelationship of functions performed by the apparatus, module or unit.

"One" and "a plurality" mentioned in the present disclosure are illustrative, are not intended to limit the present disclosure, and should be understood as "one or more" unless expressed in the context.

The names of messages or information exchanged between multiple apparatuses in the embodiments of the present disclosure are only for illustrative purposes and are not intended to limit the scope of such messages or information.

Figure 1:
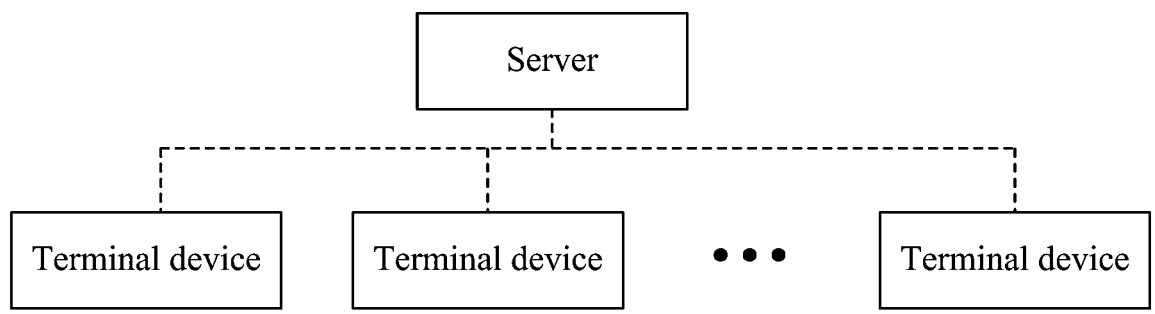
FIG. 1 is a diagram showing the deployment of terminal devices and a server.

Before a search result presentation method and apparatus, a readable medium and a terminal device provided in the present disclosure are described, application scenes related to the multiple embodiments of the present disclosure are described. An application scenes may include terminal devices and a server, and data transmission may be performed between the terminal devices and the server. The terminal devices may include, but are not limited to, mobile terminals such as a mobile phone, a laptop, a digital broadcast receiver, a personal digital assistant (PDA), a portable Android device (PAD), a portable media player (PMP) and an in-vehicle terminal (such as an in-vehicle navigation terminal), and stationary terminals such as a digital television (TV) and a desktop computer. The server may include, for example, but is not limited to, an entity server, a server cluster or a cloud server. In an implementation scene, one or more terminal devices may be included, as shown in FIG. 1.

Figure 2:
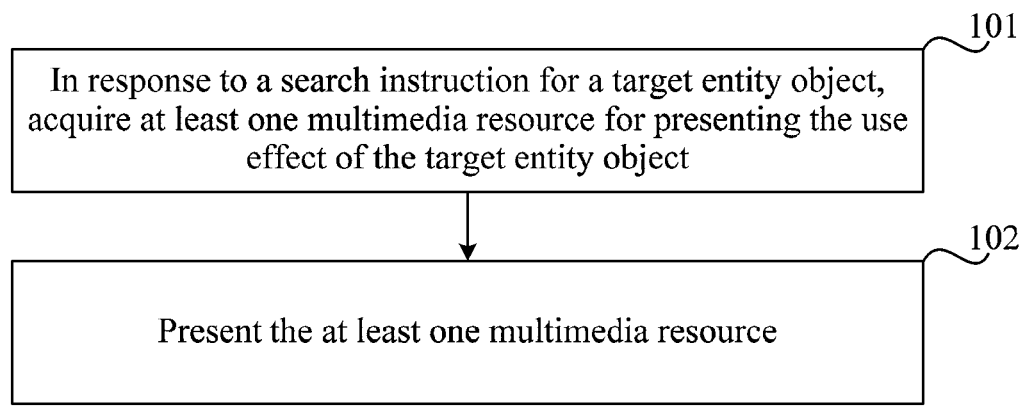
FIG. 2 is a flowchart of a search result presentation method according to an example embodiment.

FIG. 2 is a flowchart of a search result presentation method according to an example embodiment. As shown in FIG. 2, the method includes steps described below.

In step 101, in response to a search instruction for a target entity object, at least one multimedia resource for presenting the use effect of the target entity object is acquired. The at least one multimedia resource is obtained based on multimedia content corresponding to the target entity object.

For example, an execution subject of the method may be a terminal device. When a user wants to search for a target entity object, the user may input a search instruction through the terminal device. The search instruction includes a search keyword corresponding to the target entity object. The entity object may be understood as an object included in multimedia content (for example, a video), and the target entity object may be any entity object. The entity object included in the multimedia content may be classified into two types, that is, a content entity object and an operation entity object. The content entity object is used for indicating the content included in one or more image frames in the multimedia content, and may be, for example, a person, a car, a hill, a lake, a sea, a cat, a dog, a rabbit, etc. The content entity object may also be used for indicating an emotion style of the content included in one or more image frames in the multimedia content, and may be, for example, highlight content, warm content, moving content, etc. For example, the content included in multiple image frames belongs to a warm style, and then the content entity object included in these image frames is "warm content". The emotion style of the content included in the image frames may be automatically recognized by the terminal device or marked by the user according to requirements, which is not limited in the present disclosure. The operation entity object is used for indicating the operation included in one or more image frames in the multimedia content, and may include, for example, a retouching special effect, a skin smoothing special effect, a baby prop, a cat face prop, specified subtitles, specified background music, etc. The target entity object being a "baby prop" and the search instruction being "how to use a baby prop" is taken as an example, and thus the search instruction includes the search keyword "baby prop" corresponding to the target entity object.

The terminal device may send the search instruction to the server, and after receiving the search instruction, the server analyzes the search instruction to obtain the search keyword included in the search instruction, and determines the target entity object matching the search keyword. It may be understood as that multiple entity objects are pre-stored on the server, a matching degree of the search keyword with each entity object is separately determined, and one or more entity objects having the highest matching degree are taken as target entity objects. One or more search keywords may exist, and similarly, one or more target entity objects may exist.

After determining the target entity object, the server may search for the multimedia content corresponding to the target entity object from a large amount of multimedia content pre-stored on the server. The multimedia content corresponding to the target entity object may be understood as multimedia content using the target entity object or multimedia content where the target entity object appears. The server may determine search result information based on the multimedia content corresponding to the target entity object, and send the search result information to the terminal device.

The terminal device may acquire at least one multimedia resource capable of presenting the use effect of the target entity object according to the search result information. The search result information may include at least one multimedia resource for presenting the use effect of the target entity object. Accordingly, the terminal device may directly acquire the multimedia resource from the search result information. Alternatively, the search result information may include at least one group of multimedia data, where the at least one group of multimedia data is image frame data using a tag of the target entity object in the multimedia content. Accordingly, the terminal device may generate the multimedia resource for presenting the use effect of the target entity object according to the multimedia data. Alternatively, the search result information may include at least one piece of resource indication information, where the at least one piece of resource indication information is used for indicating a clip where the target entity object appears in the multimedia content. Accordingly, the terminal device may acquire the multimedia data from the server according to the resource indication information, and then generate the multimedia resource for presenting the use effect of the target entity object according to the multimedia data.

The multimedia content is a multimedia file with complete content and a relatively long duration. For example, the multimedia content may be a video file, an audio file, etc. The multimedia resource is from a part of the multimedia content which is closely related to the target entity object. For example, the multimedia resource may be a dynamic image or a video clip having a relatively short duration. The multimedia resource may be generated according to one or more image frames using the target entity object in the multimedia content, and can visually present the use effect of the target entity object. The target entity object being a "cat face prop" and the multimedia content being a video is taken as an example. Within a period from the 10th second to the 27th second in the multimedia content, the "cat face prop" is used, and then the multimedia resource may be a dynamic image generated according to image frames within the period from the 10th second to the 27th second in the multimedia content. Compared with the multimedia content, the multimedia resource includes a small amount of data and can visually present the use effect of the target entity object, reducing the consumption of data traffic.

The multimedia content is stored on the server. The multimedia content may be uploaded to the server by the user in advance, or may be scraped from a network by the server, and the source of the multimedia content is not limited in the present disclosure. The format of the multimedia content may be, for example, a video file format (such as a file in an Audio Video Interleave (AVI) format, a file in a Moving Picture Experts Group 4 (MP4) format, a file in a Windows Media Video (WMV) format, a file in a RealMedia Variable Bitrate (RMVB) format, a file in a 3GP format, a file in a QuickTime (mov) format, and a file in an Advanced Streaming Format (ASF)) or may be an audio file format (such as a file in a Moving Picture Experts Group 3 (MP3) format, a file in a WAV format, or a file in a Free Lossless Audio Codec (FLAC) format). The multimedia resource is obtained according to processing the multimedia content corresponding to the target entity object. The multimedia resource may be, for example, a dynamic image or a video clip. The dynamic image may be understood as a dynamic image obtained by clipping a certain number of image frames from the multimedia content and splicing the certain number of image frames according to a preset time sequence. For example, the dynamic image may be a dynamic image in the format of GIF. The video clip may be understood as a video obtained by clipping a certain number of image frames from the multimedia content and splicing the certain number of image frames according to a preset time sequence. For example, the video clip may be a video file in the AVI format, the MP4 format, the WMV format, the RMVB format, the 3GP format, the MOV format or the ASF.

In step 102, the at least one multimedia resource is presented.

Exemplarily, after the at least one multimedia resource is obtained, the at least one multimedia may be taken as a presentation result corresponding to the search instruction and presented on a presentation interface (for example, a display screen) of the terminal device. The presentation interface may display all multimedia resources or may display a specified number of multimedia resources (for example, three multimedia resources). Different presentation manners may be determined for different formats of multimedia resources. For example, in a case where the multimedia resource is a video, the multimedia resource may be presented in a first preset manner, where the first preset manner includes any one of: playing repeatedly, playing in reverse order, playing at different speed and playing in a window. Playing repeatedly may be understood as playing a video repeatedly. Playing in reverse order may be understood as playing a video from the last image frame to the first image frame, and the video may be repeatedly played in reverse order. Playing at different speed may be understood as adjusting the playing speed of a video. For example, a video may be played at 0.5× speed, 1.25× speed, 2× speed, etc. Playing in a window may be understood as creating a new window on the presentation interface, and presenting a video in this window. For example, three videos are presented on the presentation interface, and when the finger of the user moves to the position where a first video is presented, a new window pops up to present the first video. If the multimedia resource is a dynamic image, the multimedia resource may be presented in a second preset manner, where the second preset manner includes: presenting after magnification or presenting after minimization.

Presenting after magnification may be understood as magnifying each image frame included in the dynamic image and presenting various image frames in sequence, and presenting after minimization may be understood as minimize each image frame included in the dynamic image and presenting various image frames in sequence. For example, three dynamic images are presented on the presentation interface, and when the finger of the user moves to the position where a second dynamic image is presented, the second dynamic image is presented after magnification or presented after minimization.

The search instruction being an "effect of rabbit ears" is taken as an example, and the terminal device sends the search instruction to the server. The server analyzes the "effect of rabbit ears" to obtain a search keyword "rabbit ears". From pre-stored videos, the server finds the multimedia content using the "rabbit ears", and the multimedia content includes video 1, video 2 and video 3. The server determines the search result information of the "rabbit ears" according to video 1, video 2 and video 3, and sends the search result information to the terminal device.

Figure 3:
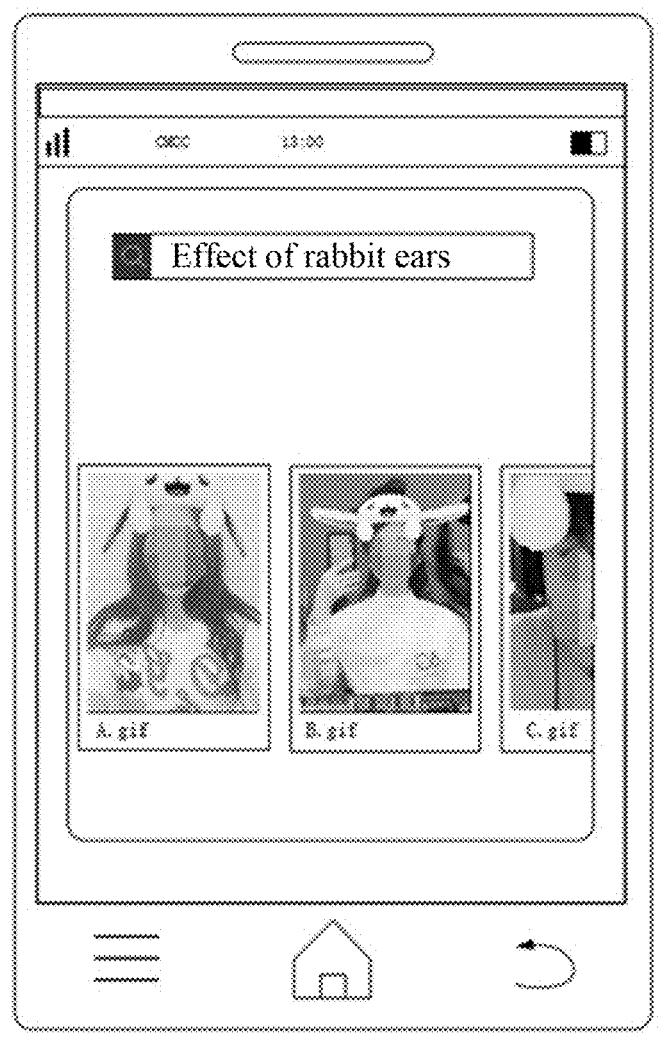
FIG. 3 is a view of presenting a search result according to an example embodiment.

The terminal device acquires a multimedia resource capable of presenting the use effect of the "rabbit ears" according to the search result information. For example, the multimedia resource may include A.gif corresponding to video 1, B.gif corresponding to video 2 and C.gif corresponding to video 3. The multimedia resource is presented on the display screen of the terminal device. In the embodiment of the present disclosure, A.gif, B.gif and C.gif may be presented on the display screen, as shown in FIG. 3. Since A.gif, B.gif and C.gif can present the use effect of the "rabbit ears", the user can visually view the use effect of a "rabbit ear prop", so that the effectiveness of the search is greatly improved; moreover, the user does not need to separately click on and watch the complete video 1, the complete video 2 and the complete video 3, so that the consumption of data traffic is greatly reduced.

In summary, in the present disclosure, in response to the search instruction for the target entity object, at least one multimedia resource for presenting the use effect of the target entity object is acquired, where the at least one multimedia resource is obtained based on the multimedia content corresponding to the target entity object; and the at least one multimedia resource is presented. In present disclosure, for search instructions for different target entity objects, a multimedia resource capable of presenting the use effect of a target entity object can be obtained according to multimedia content corresponding to the target entity object, and the multimedia resource is presented without presenting the complete multimedia content, so that the effectiveness of the search can be improved, and the consumption of data traffic can be reduced.

Figure 4:
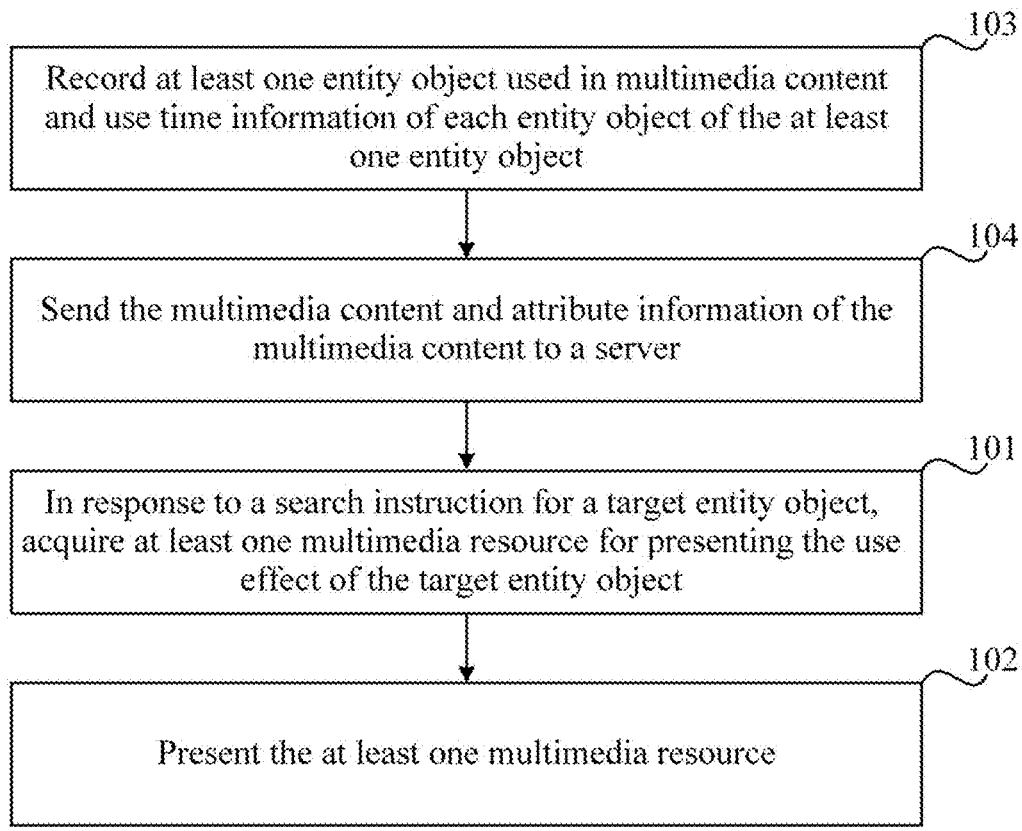
FIG. 4 is a flowchart of another search result presentation method according to an example embodiment.

FIG. 4 is a flowchart of another search result presentation method according to an example embodiment. As shown in FIG. 4, the method may further include steps described below.

In step 103, at least one entity object used in multimedia content and use time information of each entity object of the at least one entity object are recorded.

In step 104, the multimedia content and attribute information of the multimedia content are sent to a server. The attribute information of the multimedia content includes identification information of the each entity object and the use time information of the each entity object.

In an implementation, during the shooting of the multimedia content, or after the shooting of the multimedia content is finished, the terminal device may use multiple entity objects in the multimedia content, for example, may add subtitles and background music to the multimedia content, may use special effects, props and the like for a video, or may directly add content tags corresponding to different content to the multimedia content. The terminal device may record each entity object used in the multimedia content and the use time information corresponding to each entity object. The use time information may include: the time of using the entity object in the multimedia content (for example, a start time and an end time), or the series number of an image frame using the entity object in the multimedia content (for example, the series number of a start frame and the series number of an end frame). The terminal device may send the identification information (the identification information can uniquely identify a corresponding entity object) of each entity object and the use time information of each entity object as the attribute information of the multimedia content, together with the multimedia content, to the server. After reception, the server may determine a mapping relationship between entity object identification information and image frame information according to the identification information of each entity object and the use time information of each entity object, where the image frame information represents a clip where each entity object appears in the multimedia content. The mapping relationship stores multiple records, and each record includes an entity object and a clip where the entity object appears in the multimedia content.

The implementation of step 101 is described below for different scenes of acquiring the multimedia resource.

In scene one, the multimedia resource may be generated through the process described below. The server determines target entity object identification information corresponding to the target entity object from pre-stored identification information of multiple entity objects, and determines image frame information of the target entity object according to the mapping relationship between the entity object identification information and the image frame information. The image frame information of the target entity object can indicate a clip where the target entity object appears in the multimedia content. The image frame information may be understood as time information (for example, the 5th second to the 25th second) corresponding to image frames using the target entity object in the multimedia content, or may be understood as frame series number information (for example, the 20th frame to the 50th frame) corresponding to image frames using the target entity object in the multimedia content. The server extracts the clip where the target entity object appears in the multimedia content from the multimedia content based on the image frame information of the target entity object, thereby generating the multimedia resource capable of presenting the use effect of the target entity object. In this scene, the terminal device can acquire the multimedia resource directly from the server. The image frame information of the target entity object may indicate consecutive image frames (which may be understood as all image frames using the target entity object) in the multimedia content, or may indicate non-consecutive image frames (which may be understood as key image frames using the target entity object) in the multimedia content.

A target video being video 1 is taken as an example. If the target entity object is a "skin smoothing special effect", the server may filter out image frames where a "skin smoothing special effect tag" appears from video 1, and use these image frames to make a dynamic image in the GIF format or a video clip in the WMV format, and the terminal device may obtain the dynamic image or the video clip from the server and present the dynamic image or the video clip.

Figure 5:
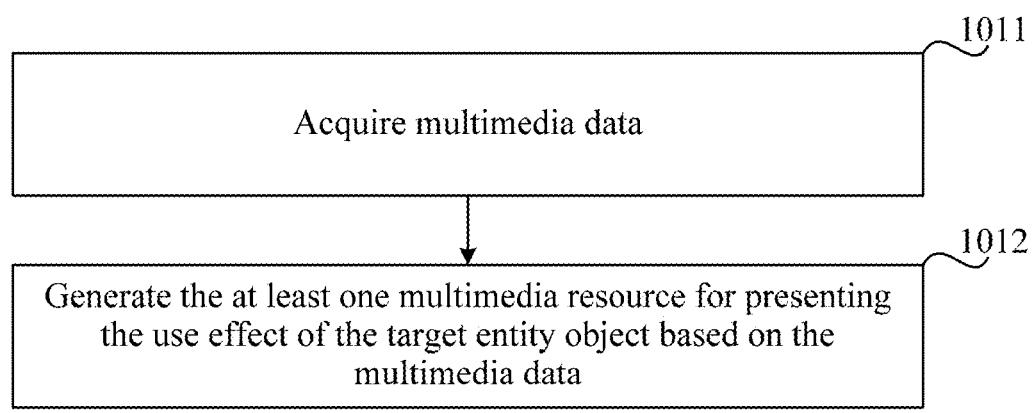
FIG. 5 is a flowchart of another search result presentation method according to an example embodiment.

In scene two, the implementation of step 101 is shown in FIG. 5 and may include steps described below.

In step 1011, multimedia data is acquired, where the multimedia data includes image frame data using the target entity object in the multimedia content corresponding to the target entity object.

In step 1012, the at least one multimedia resource for presenting the use effect of the target entity object is generated based on the multimedia data.

Exemplarily, the multimedia resource may also be generated by the terminal device according to the multimedia data sent by the server. The server may determine target entity object identification information corresponding to the target entity object from pre-stored identification information of multiple entity objects, determine the image frame data using the target entity object in the multimedia content according to the mapping relationship between the entity object identification information and the image frame information, and send the image frame data as the multimedia data to the terminal device. The image frame information may be understood as time information (for example, the 5th second to the 25th second) corresponding to image frames using the target entity object in the multimedia content, or may be understood as frame series number information (for example, the 20th frame to the 50th frame) corresponding to image frames using the target entity object in the multimedia content. The multimedia data may further include sequence information of image frames using the target entity object in the multimedia content. The image frame data may be understood as one or more image frames using the target entity object in the multimedia content. The sequence information may be understood as a sequence of the image frames using the target entity object in the multimedia content. For example, the sequence information may be a sequence of times (for example, the time when each image frame appears in the multimedia content) of the image frames using the target entity object in the multimedia content, or may be a sequence of frame series numbers (for example, the frame series number of each image frame in the multimedia content) corresponding to the image frames using the target entity object in the multimedia content. The image frame data may refer to consecutive image frames (which may be understood as all image frames using the target entity object) in the multimedia content, or may refer to non-consecutive image frames (which may be understood as key image frames using the target entity object) in the multimedia content.

After acquiring the multimedia data, the terminal device may generate the multimedia resource for presenting the use effect of the target entity object based on the multimedia data. For example, the multimedia resource may be generated by splicing the image frame data included in the multimedia data according to the sequence information.

The multimedia content being video 2 is taken as an example. If the target entity object is a "retouching special effect", the server may filter out image frames using the "retouching special effect" from video 2, and send these image frames and sequence information of these image frames as the multimedia data to the terminal device. According to the received image frames and the sequence information of the image frames, the terminal device makes a dynamic image in the format of GIF or a video clip in the format of MP4 as the multimedia resource.

Figure 6:
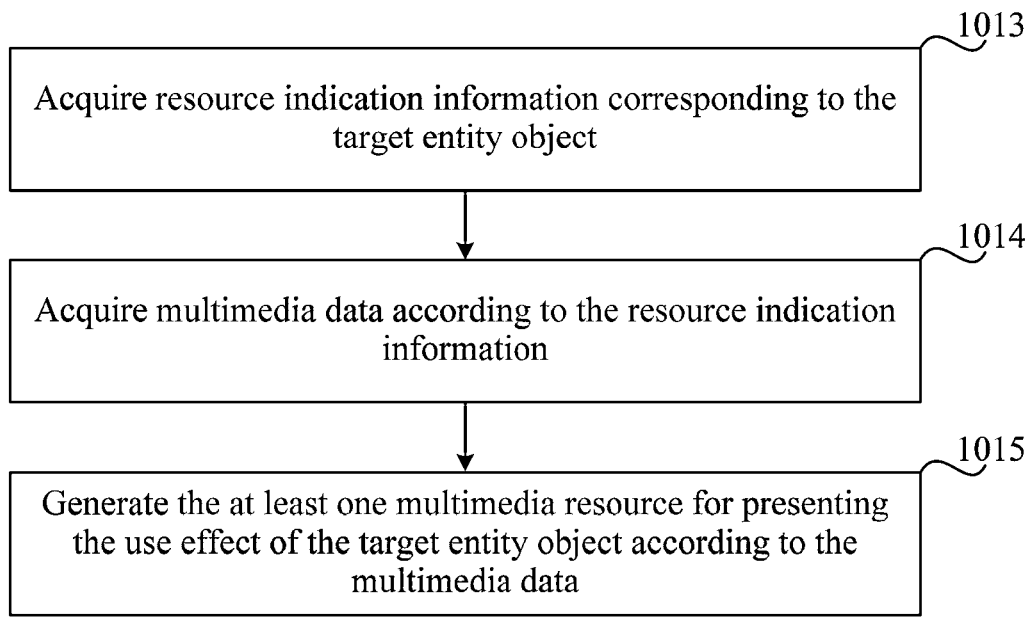
FIG. 6 is a flowchart of another search result presentation method according to an example embodiment.

In scene three, the implementation of step 101 is shown in FIG. 6 and may include steps described below.

In step 1013, resource indication information corresponding to the target entity object is acquired, where the resource indication information is used for indicating a clip where the target entity object appears in the multimedia content.

In step 1014, multimedia data is acquired according to the resource indication information, where the multimedia data includes image frame data using the target entity object in the multimedia content.

In step 1015, the at least one multimedia resource for presenting the use effect of the target entity object is generated according to the multimedia data.

Exemplarily, the multimedia resource may also be generated through the process described below. The terminal device acquires the resource indication information from the server, acquires the multimedia data from the server according to the resource indication information, and finally generates the multimedia resource according to the multimedia data. The server may determine target entity object identification information corresponding to the target entity object from pre-stored identification information of multiple entity objects, and determine the resource indication information according to the mapping relationship between the entity object identification information and the image frame information. The image frame information may be understood as time information (for example, the 5th second to the 25th second) corresponding to image frames using the target entity object in the multimedia content, or may be understood as frame series number information (for example, the 20th frame to the 50th frame) corresponding to image frames using the target entity object in the multimedia content. The resource indication information can indicate a clip where the target entity object appears in the multimedia content. For example, the resource indication information may be time information (for example, the 5th second in the multimedia content to the 10th second in the multimedia content) corresponding to the image frames using the target entity object in the multimedia content, or may be frame series number information (for example, the 15th frame in the multimedia content to the 30th frame in the multimedia content) corresponding to the image frames using the target entity object in the multimedia content.

After acquiring the resource indication information, the terminal device may acquire the multimedia data from the server according to the resource indication information. The multimedia data includes the image frame data using the target entity object in the multimedia content. The multimedia data may further include sequence information of image frames using the target entity object in the multimedia content. The image frame data may be understood as one or more image frames using the target entity object in the multimedia content. The sequence information may be understood as a sequence of the image frames using the target entity object in the multimedia content. For example, the sequence information may be a sequence of times (for example, the time when each image frame appears in the multimedia content) of the image frames using the target entity object in the multimedia content, or may be a sequence of frame series numbers (for example, the frame series number of each image frame in the multimedia content) corresponding to the image frames using the target entity object in the multimedia content. The image frame data may refer to consecutive image frames (which may be understood as all image frames using the target entity object) in the multimedia content, or may refer to non-consecutive image frames (which may be understood as key image frames using the target entity object) in the multimedia content. After acquiring the multimedia data, the terminal device may generate the multimedia resource for presenting the use effect of the target entity object based on the multimedia data. For example, the multimedia resource may be obtained by splicing the image frame data included in the multimedia data according to the sequence information.

Different from scene two, in scene two, the server directly determines the image frame data using the target entity object in the multimedia content, and directly sends the image frame data to the terminal device. In scene three, the terminal device may acquire the image frames using the target entity object in the multimedia content from the server in clips and frames.

The multimedia content being video 3 is taken as an example. If the target entity object is a "sea", the server may filter out clips where the "sea" appears from video 3, and send the resource indication information corresponding to these clips to the terminal device. The resource indication information may be, for example, time information of image frames where the "sea" appears in video 3, such as the 15th second to the 100th second, which indicates that the "sea" appears in the image frames within the 15th second to the 100th second in video 3. The terminal device acquires the image frames within the 15th second to the 100th second in video 3 and frame series numbers of these image frames from the server according to the resource indication information, and makes these image frames, according to the sequence of the frame series numbers, into a dynamic image in the format of GIF or a video clip in the format of AVI as the multimedia resource.

In the embodiment of the present disclosure, the manner for the terminal device or the server splicing the image frame data included in the multimedia data according to the sequence information to obtain the multimedia resource may include the step described below. All the image frame data (that is, all the image frames using the target entity object in the multimedia content) included in the multimedia data is combined into a dynamic image or a video clip, or part of the image frame data (that is, part of the image frames using the target entity object in the multimedia content) included in the multimedia data may be combined into a dynamic image or a video clip, which is not limited in the present disclosure.

For example, if the 21st image frame to the 75th image frame in the multimedia content use the target entity object, these 55 image frames may be combined into a video clip according to the time sequence, or the 47th image frame to the 56th image frame in the middle may be taken and combined into a dynamic image.

Figure 7:
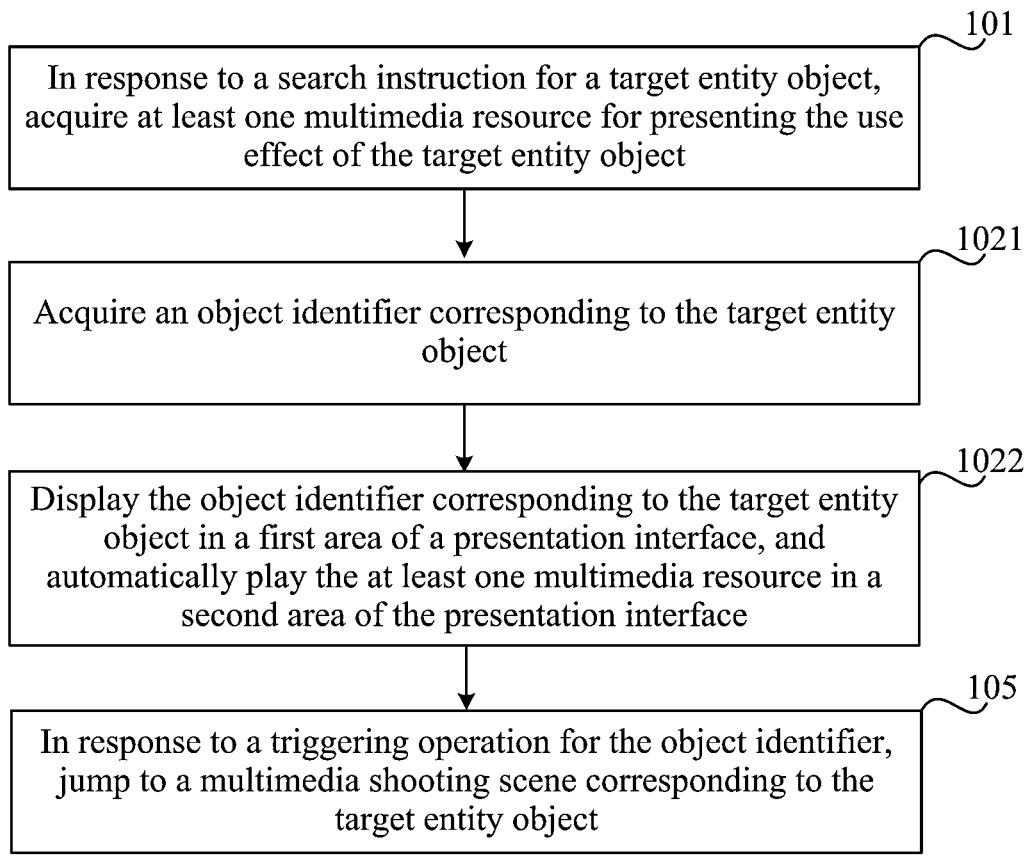
FIG. 7 is a flowchart of another search result presentation method according to an example embodiment.

The image frames using the target entity object may be non-consecutive in the multimedia content, that is, the target entity object may be used multiple times in the multimedia content. For example, in the multimedia content, the image frames using the target entity object are the 10th image frame to the 22nd image frame and the 153th image frame to the 170th image frame. Then, the 10th image frame to the 22nd image frame and the 153th image frame to the 170th image frame may be selected to be combined into a dynamic image, the 15th image frame to the 20th image frame may be selected to be combined into a dynamic image, or the 160th image frame to the 170th image frame may be selected to be combined into a dynamic image FIG. 7 is a flowchart of another search result presentation method according to an example embodiment. As shown in FIG. 7, step 102 may include steps described below.

In step 1021, an object identifier corresponding to the target entity object is acquired In step 1022, the object identifier corresponding to the target entity object is displayed in a first area of a presentation interface, and the at least one multimedia resource is automatically played in a second area of the presentation interface.

For example, the terminal device may acquire the object identifier corresponding to the target entity object from the server in addition to presenting the multimedia resource. The object identifier may be understood as an icon corresponding to the target entity object. The terminal device may further acquire a link corresponding to the target entity object while acquiring the object identifier corresponding to the target entity object from the server, where the object identifier is associated with the link. The terminal device may simultaneously present the multimedia resource and the object identifier corresponding to the target entity object in the presentation interface. For example, the object identifier corresponding to the target entity object may be displayed in the first area of the presentation interface of the terminal device, and the at least one multimedia resource is automatically played in the second area of the presentation interface. The first area and the second area may be different areas on the presentation interface.

The method may further include step 105.

In step 105, in response to a triggering operation for the object identifier, a multimedia shooting scene corresponding to the target entity object is jumped to.

Exemplarily, after viewing the use effect of the target entity object through the multimedia resource, the user may issue the triggering operation for the object identifier by clicking the object identifier corresponding to the target entity object. In response to the triggering operation, the terminal device may jump to the multimedia shooting scene corresponding to the target entity object through the link associated with the object identifier. In this manner, the user can not only directly view the use effect of the target entity object through the multimedia resource, but also quickly jump to the multimedia shooting scene corresponding to the target entity object through the object identifier corresponding to the target entity object, so that the effectiveness of the search and the convenience of operations are improved.

Figure 8:
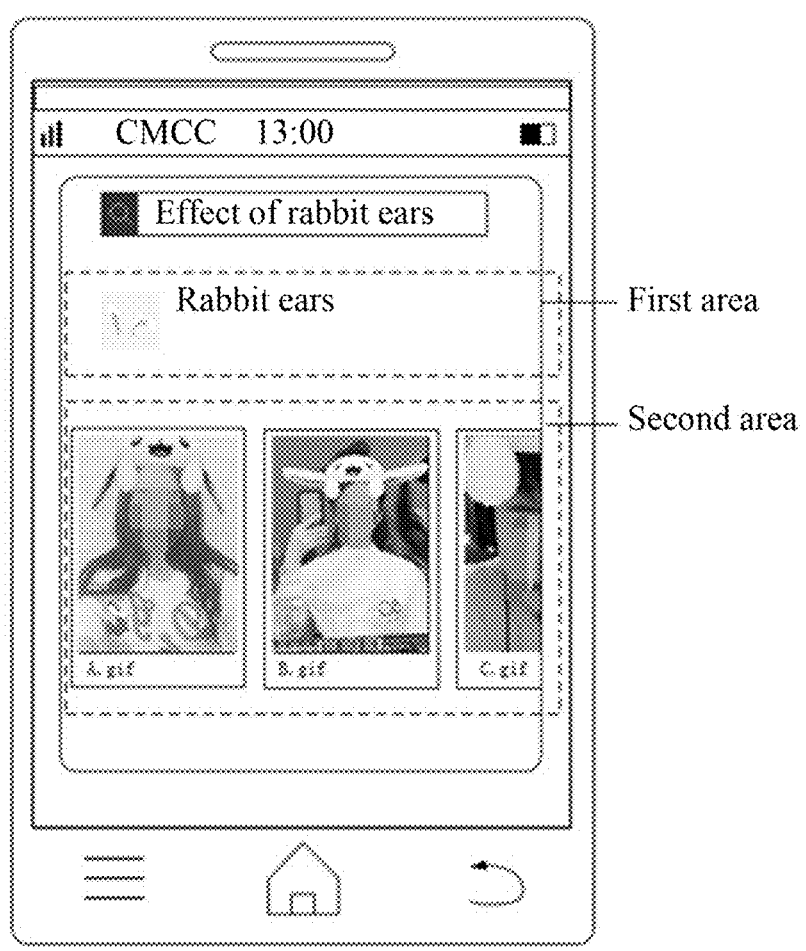
FIG. 8 is a view of presenting a search result according to an example embodiment.

The target entity object being a "rabbit ear prop" is taken as an example. From pre-stored multimedia content, the server finds a multimedia content using the "rabbit ear prop", and the multimedia content includes video 1, video 2 and video 3. The terminal device acquires a multimedia resource capable of presenting the use effect of the "rabbit ear prop", and the multimedia resource includes A.gif corresponding to video 1, B.gif corresponding to video 2 and C.gif corresponding to video 3. The terminal device further acquires an object identifier corresponding to the "rabbit ear prop". The object identifier corresponding to the "rabbit ear prop" is displayed in the first area of the display screen of the terminal device, and A.gif, B.gif and C.gif are automatically played in the second area, as shown in FIG. 8. When the user clicks on the object identifier corresponding to the "rabbit ear prop" and issues a triggering operation, the terminal device can jump to a multimedia shooting scene using the "rabbit ear prop".

In an application scene, the implementation of step 101 may be described below.

At least one multimedia resource for presenting the use effect of an entity object set is acquired, where the entity object set includes: the target entity object and an association entity object, where the association entity object is an entity object having an association relationship with the target entity object.

For example, multiple entity objects may be included in the multimedia content and association relationships may exist between the entity objects, and two or more entity objects having an association relationship may be associated. Entity objects having an association relationship between each other may be entity objects frequently used simultaneously by the user, or may be multiple entity objects in a group of entity objects. For example, the user generally uses a "baby prop" and a "rabbit ear prop" simultaneously, so that it can be determined that an association relationship exists between the "baby prop" and the "rabbit ear prop". Alternatively, a "retouching special effect" and a "skin smoothing special effect" both belong to a group of entity objects used for portrait processing, so that it can be determined that an association relationship exists between the "retouching special effect" and the "skin smoothing special effect". Thus, when the multimedia resource is acquired, at least one multimedia resource for presenting the use effect of the entity object set can be acquired, where the entity object set includes the target entity object and the association entity object having the association relationship with the target entity object. In this manner, the user can simultaneously view the use effect of the target entity object and the use effect of the association entity object through the multimedia resource, so that the effectiveness of the search is improved.

In another application scene, the implementation of step 101 may be described below.

The at least one multimedia resource and an association multimedia resource for presenting the use effect of an association entity object are acquired, where the association entity object is an entity object having an association relationship with the target entity object.

The implementation of step 102 may be described below.

The at least one multimedia resource is presented in a third area of a presentation interface, and the association multimedia resource is presented in a fourth area of the presentation interface.

Exemplarily, the terminal device may further acquire the association multimedia resource for presenting the use effect of the association entity object while acquiring the multimedia resource for presenting the use effect of the target entity object, where the association entity object is an entity object having an association relationship with the target entity object. Entity objects having an association relationship between each other may be entity objects frequently used simultaneously by the user, or may be multiple entity objects in a group of entity objects.

In this manner, the terminal device can simultaneously present the multimedia resource and the association multimedia resource in the presentation interface. For example, the multimedia resource may be presented in the third area of the presentation interface, and the association multimedia resource may be presented in the fourth area of the presentation interface. The third area and the fourth area may be different areas on the presentation interface. Therefore, the user can view the use effect of the target entity object through the multimedia resource, and view the use effect of the association entity object through the association multimedia resource, so that the effectiveness of the search is improved.

In summary, in the present disclosure, in response to the search instruction for the target entity object, at least one multimedia resource for presenting the use effect of the target entity object is acquired, where the at least one multimedia resource is obtained based on the multimedia content corresponding to the target entity object; and the at least one multimedia resource is presented. In the present disclosure, for search instructions for different target entity objects, a multimedia resource capable of presenting the use effect of a target entity object can be obtained according to multimedia content corresponding to the target entity object, and the multimedia resource is presented without presenting the complete multimedia content, so that the effectiveness of the search can be improved, and the consumption of data traffic can be reduced.

Figure 9:
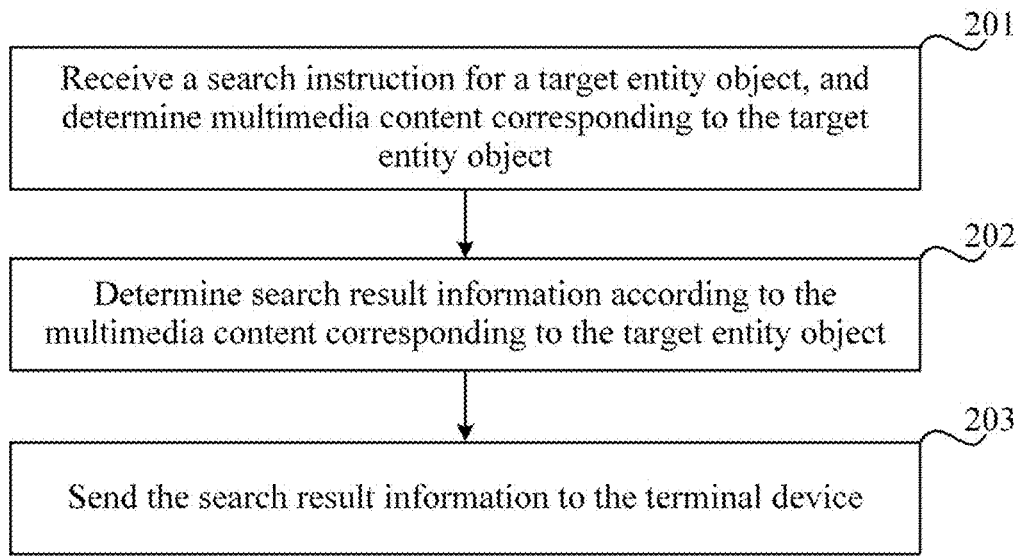
FIG. 9 is a flowchart of a search result presentation method according to an example embodiment.

FIG. 9 is a flowchart of a search result presentation method according to an example embodiment. As shown in FIG. 9, the method includes steps described below.

In step 201, a search instruction for a target entity object is received, and multimedia content corresponding to the target entity object is determined.

For example, an execution subject of the method may be a server. When a user wants to search for a target entity object, the user may input a search instruction through a terminal device. The search instruction includes a search keyword corresponding to the target entity object. The terminal device may send the search instruction to the server, and after receiving the search instruction, the server analyzes the search instruction to obtain the search keyword included in the search instruction, and determines the target entity object matching the search keyword. It may be understood as that multiple entity objects are pre-stored on the server, a matching degree of the search keyword with each entity object is separately determined, and one or more entity objects having the highest matching degree are taken as target entity objects. One or more search keywords may exist, and similarly, one or more target entity objects may exist. For example, the target entity object being a "baby prop" and the search instruction being "how to use a baby prop" is taken as an example; the server may analyze "how to use a baby prop", determine the search keyword "baby prop" included in the search instruction, and thus determine that the target entity object is the "baby prop".

After determining the target entity object, the server may search for the multimedia content corresponding to the target entity object from a large amount of multimedia content pre-stored on the server. The multimedia content corresponding to the target entity object may be understood as multimedia content using the target entity object or multimedia content where the target entity object appears. The multimedia content stored on the server may be uploaded to the server by the user in advance, or may be scraped from a network by the server, and the source of the multimedia content is not limited in the present disclosure. The format of the multimedia content may be, for example, a video file (such as an AVI file, an MP4 file, a WMV file, an RMVB file, a 3GP file, a MOV file or an ASF file).

In step 202, search result information is determined according to the multimedia content corresponding to the target entity object, where the search result information includes: at least one multimedia resource for presenting the use effect of the target entity object, at least one group of multimedia data or at least one piece of resource indication information. The at least one group of multimedia data is image frame data using a tag of the target entity object in the multimedia content, and the at least one piece of resource indication information is used for indicating a clip where the target entity object appears in the multimedia content.

In step 203, the search result information is sent to the terminal device.

Exemplarily, the server may determine the search result information based on the multimedia content corresponding to the target entity object, and send the search result information to the terminal device. The search result information may be classified into three types. The first type refers to at least one multimedia resource for presenting the use effect of the target entity object, the second type refers to at least one group of multimedia data, and the third type refers to at least one piece of resource indication information. Manners for determining the three types of search result information are described below.

For the first type of search result information, the server may determine target entity object identification information corresponding to the target entity object from pre-stored identification information of multiple entity objects, and determine image frame information of the target entity object according to a mapping relationship between entity object identification information and image frame information. The image frame information of the target entity object can indicate a clip where the target entity object appears in the multimedia content. The mapping relationship may be understood as storing multiple records, and each record includes an entity object and a clip where the entity object appears in the multimedia content. The image frame information may be understood as time information (for example, the 5th second to the 25th second) corresponding to image frames using the target entity object in the multimedia content, or may be understood as frame series number information (for example, the 20th frame to the 50th frame) corresponding to image frames using the target entity object in the multimedia content. The server extracts the clip where the target entity object appears in the multimedia content from the multimedia content based on the image frame information of the target entity object, thereby generating the multimedia resource for presenting the use effect of the target entity object. The server may send the multimedia resource to the terminal device so that the terminal device presents the multimedia resource. The image frame information of the target entity object may indicate consecutive image frames (which may be understood as all image frames using the target entity object) in the multimedia content, or may indicate non-consecutive image frames (which may be understood as key image frames using the target entity object) in the multimedia content.

For the second type of search result information, the server may determine target entity object identification information corresponding to the target entity object from pre-stored identification information of multiple entity objects, determine image frame data using the target entity object in the multimedia content according to a mapping relationship between entity object identification information and image frame information, and send the image frame data as the multimedia data to the terminal device. The image frame information may be understood as time information (for example, the 5th second to the 25th second) corresponding to image frames using the target entity object in the multimedia content, or may be understood as frame series number information (for example, the 20th frame to the 50th frame) corresponding to image frames using the target entity object in the multimedia content. The multimedia data may further include sequence information of image frames using the target entity object in the multimedia content. The image frame data may be understood as one or more image frames using the target entity object in the multimedia content. The sequence information may be understood as a sequence of the image frames using the target entity object in the multimedia content. For example, the sequence information may be a sequence of times (for example, the time when each image frame appears in the multimedia content) of the image frames using the target entity object in the multimedia content, or may be a sequence of frame series numbers (for example, the frame series number of each image frame in the multimedia content) corresponding to the image frames using the target entity object in the multimedia content. The image frame data may refer to consecutive image frames (which may be understood as all image frames using the target entity object) in the multimedia content, or may refer to non-consecutive image frames (which may be understood as key image frames using the target entity object) in the multimedia content. After acquiring the multimedia data, the terminal device may generate the multimedia resource for presenting the use effect of the target entity object based on the multimedia data, and present the multimedia resource. For example, the multimedia resource may be generated by splicing the image frame data included in the multimedia data according to the sequence information.

For the third type of search result information, the server may determine target entity object identification information corresponding to the target entity object from pre-stored identification information of multiple entity objects, and determine the resource indication information according to a mapping relationship between entity object identification information and image frame information. The image frame information may be understood as time information (for example, the 5th second to the 25th second) corresponding to image frames using the target entity object in the multimedia content, or may be understood as frame series number information (for example, the 20th frame to the 50th frame) corresponding to image frames using the target entity object in the multimedia content. The resource indication information can indicate a clip where the target entity object appears in the multimedia content. For example, the resource indication information may be time information (for example, the 5th second in the multimedia content to the 10th second in the multimedia content) corresponding to the image frames using the target entity object in the multimedia content, or may be frame series number information (for example, the 15th frame in the multimedia content to the 30th frame in the multimedia content) corresponding to the image frames using the target entity object in the multimedia content. After acquiring the resource indication information, the terminal device may acquire the multimedia data from the server according to the resource indication information. The multimedia data includes image frame data using the target entity object in the multimedia content. The multimedia data may further include sequence information of image frames using the target entity object in the multimedia content. The image frame data may be understood as one or more image frames using the target entity object in the multimedia content. The sequence information may be understood as a sequence of the image frames using the target entity object in the multimedia content. For example, the sequence information may be a sequence of times (for example, the time when each image frame appears in the multimedia content) of the image frames using the target entity object in the multimedia content, or may be a sequence of frame series numbers (for example, the frame series number of each image frame in the multimedia content) corresponding to the image frames using the target entity object in the multimedia content. The image frame data may refer to consecutive image frames (which may be understood as all image frames using the target entity object) in the multimedia content, or may refer to non-consecutive image frames (which may be understood as key image frames using the target entity object) in the multimedia content. After acquiring the multimedia data, the terminal device may generate the multimedia resource for presenting the use effect of the target entity object based on the multimedia data, and present the multimedia resource. For example, the multimedia resource may be obtained by splicing the image frame data included in the multimedia data according to the sequence information.

The multimedia content in the preceding embodiments may be understood as a multimedia file with complete content and a relatively long duration. For example, the multimedia content may be a video file, an audio file, etc. The multimedia resource is from a part of the multimedia content which is closely related to the target entity object. For example, the multimedia resource may be a dynamic image or a video clip having a relatively short duration. The multimedia resource may be generated according to one or more image frames using the target entity object in the multimedia content, and can visually present the use effect of the target entity object. The target entity object being a "cat face prop" and the multimedia content being a video is taken as an example. From the 10th second to the 27th second in the multimedia content, the "cat face prop" is used, and then the multimedia resource may be a dynamic image generated according to image frames within the 10th second to the 27th second in the multimedia content. Compared with the multimedia content, the multimedia resource includes a small amount of data and can visually present the use effect of the target entity object. In this manner, the terminal device can present the multimedia resource without presenting the complete multimedia content, so that the effectiveness of the search can be improved, and the consumption of data traffic can be reduced.

Figure 10:
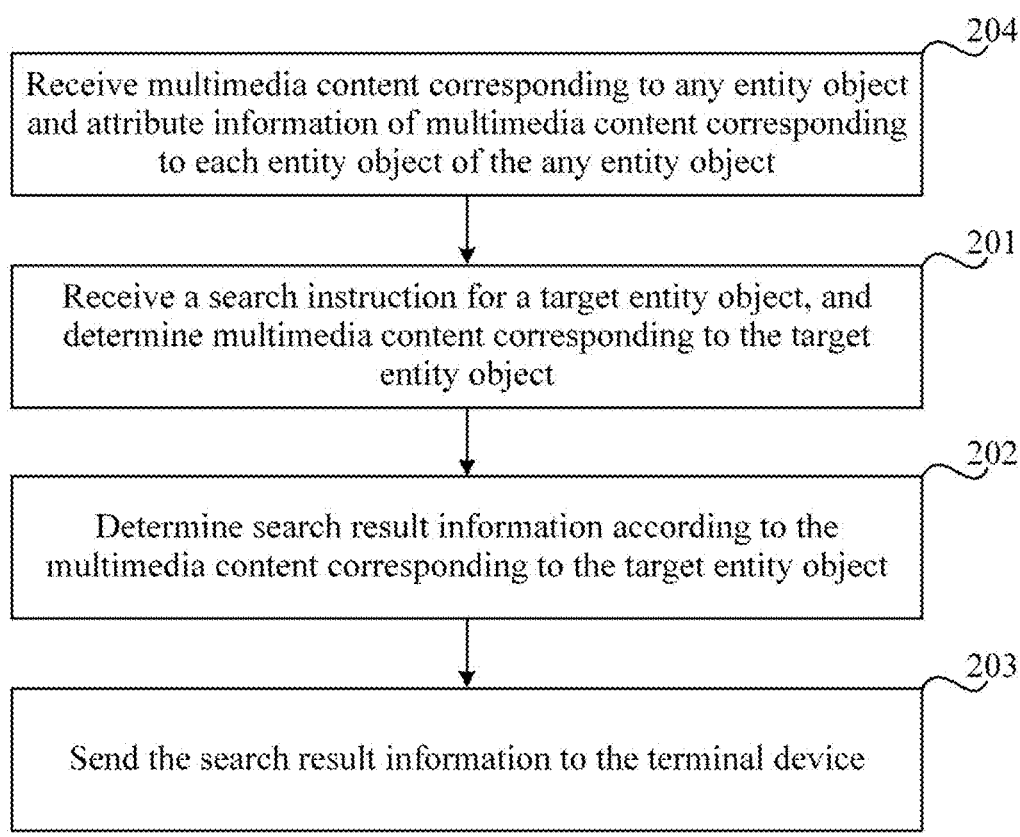
FIG. 10 is a flowchart of another search result presentation method according to an example embodiment.

FIG. 10 is a flowchart of another search result presentation method according to an example embodiment. As shown in FIG. 10, the method may further include step 204 described below.

In step 204, multimedia content corresponding to any entity object and attribute information of multimedia content corresponding to each entity object of the any entity object are received. The attribute information includes identification information of the each entity object and use time information of the each entity object.

In an implementation, during the shooting of the multimedia content, or after the shooting of the multimedia content is finished, the terminal device may use multiple entity objects in the multimedia content, for example, may add subtitles and background music to the multimedia content, may use special effects, props and the like for a video, or may directly add content tags corresponding to different pieces of content to the multimedia content. The terminal device may record each entity object used in the multimedia content and the use time information corresponding to each entity object. The use time information may include: the time of using the entity object in the multimedia content (for example, a start time and an end time), or the series number of an image frame using the entity object in the multimedia content (for example, the series number of a start frame and the series number of an end frame). The terminal device may send the identification information (the identification information can uniquely identify a corresponding entity object) of each entity object and the use time information of each entity object as the attribute information of the multimedia content, together with the multimedia content, to the server. After receiving the multimedia content and the attribute information of the multimedia content, the server may determine a mapping relationship between entity object identification information and image frame information according to the identification information of each entity object and the use time information of each entity object, where the image frame information represents a clip where each entity object appears in the multimedia content. It may be understood as that the mapping relationship stores multiple records, and each record includes an entity object and a clip where the entity object appears in the multimedia content.

Figure 11:
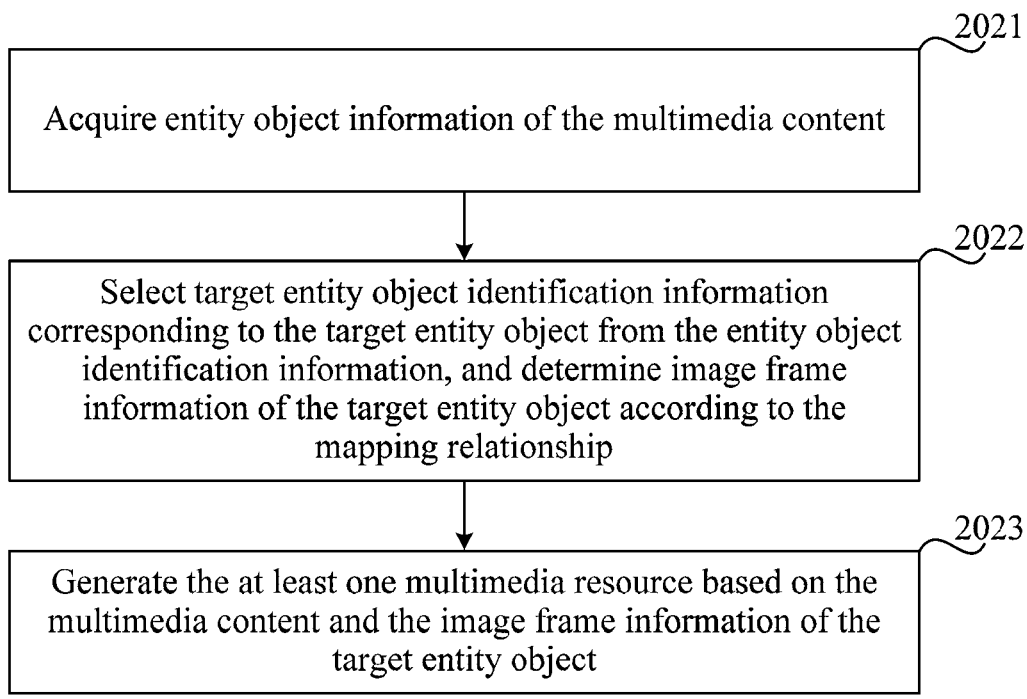
FIG. 11 is a flowchart of another search result presentation method according to an example embodiment.

FIG. 11 is a flowchart of another search result presentation method according to an example embodiment. As shown in FIG. 11, step 202 may be implemented by steps described below.

In step 2021, entity object information of the multimedia content is acquired. The entity object information includes: entity object identification information used in the multimedia content and a mapping relationship between the entity object identification information and image frame information, where the image frame information represents a clip where each entity object appears in the multimedia content.

In step 2022, target entity object identification information corresponding to the target entity object is selected from the entity object identification information, and image frame information of the target entity object is determined according to the mapping relationship.

In step 2023, the at least one multimedia resource is generated based on the multimedia content and the image frame information of the target entity object.

The server may acquire the entity object information of the multimedia content, where the entity object information includes: the entity object identification information used in the multimedia content and the mapping relationship between the entity object identification information and the image frame information. The target entity object identification information corresponding to the target entity object is determined from the identification information of entity objects, and the image frame information of the target entity object is determined according to the mapping relationship between the entity object identification information and the image frame information. The image frame information of the target entity object can indicate a clip where the target entity object appears in the multimedia content. The server extracts the clip where the target entity object appears in the multimedia content from the multimedia content based on the image frame information of the target entity object, thereby generating the multimedia resource for presenting the use effect of the target entity object.

Figure 12:
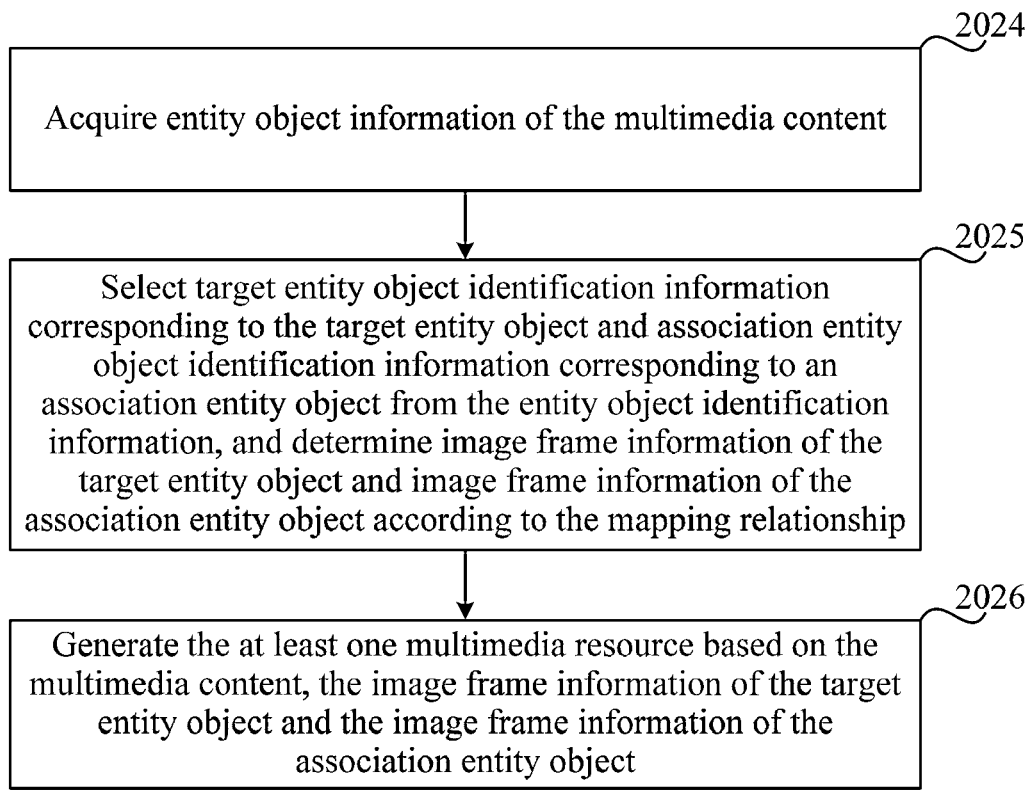
FIG. 12 is a flowchart of another search result presentation method according to an example embodiment.

FIG. 12 is a flowchart of another search result presentation method according to an example embodiment. As shown in FIG. 12, step 202 may be implemented by steps described below.

In step 2024, entity object information of the multimedia content is acquired. The entity object information includes: entity object identification information used in the multimedia content and a mapping relationship between the entity object identification information and image frame information, where the image frame information represents a clip where each entity object appears in the multimedia content.

In step 2025, target entity object identification information corresponding to the target entity object and association entity object identification information corresponding to an association entity object are selected from the entity object identification information, and image frame information of the target entity object and image frame information of the association entity object are determined according to the mapping relationship, where the association entity object is an entity object having an association relationship with the target entity object.

In step 2026, the at least one multimedia resource is generated based on the multimedia content, the image frame information of the target entity object and the image frame information of the association entity object.

For example, multiple entity objects may be included in the multimedia content and association relationships may exist between the entity objects, and two or more entity objects having an association relationship may be associated. Entity objects having an association relationship between each other may be entity objects frequently used simultaneously by the user, or may be multiple entity objects in a group of entity objects. For example, the user generally uses a "baby prop" and a "rabbit ear prop" simultaneously, so that it can be determined that an association relationship exists between the "baby prop" and the "rabbit ear prop". Alternatively, a "retouching special effect" and a "skin smoothing special effect" both belong to a group of entity objects used for portrait processing, so that it can be determined that an association relationship exists between the "retouching special effect" and the "skin smoothing special effect".

Thus, the server may acquire the entity object information of the multimedia content when determining the multimedia resource, where the entity object information includes the entity object identification information used in the multimedia content and the mapping relationship between the entity object identification information and the image frame information. The target entity object identification information corresponding to the target entity object and the association entity object identification information corresponding to the association entity object are determined from identification information of entity objects. The image frame information of the target entity object and the image frame information of the association entity object are determined according to the mapping relationship between the entity object identification information and the image frame information. The image frame information of the target entity object can indicate a clip where the target entity object appears in the multimedia content. The image frame information of the association entity object can indicate a clip where the association entity object appears in the multimedia content.

The server extracts the clip where the target entity object appears in the multimedia content and the clip where the association entity object appears in the multimedia content from the multimedia content based on the image frame information of the target entity object and the image frame information of the association entity object, thereby generating the multimedia resource for presenting the use effect of the target entity object and the use effect of the association entity object. In this manner, when the terminal device presents the multimedia resource, the user can simultaneously view the use effect of the target entity object and the use effect of the association entity object, so that the effectiveness of the search is improved. In the clip where the target entity object appears in the multimedia content and the clip where the association entity object appears in the multimedia content which are extracted from the multimedia content, repeated image frames may exist, that is, an image frame where both the target entity object and the association entity object appear may exist.

Figure 13:
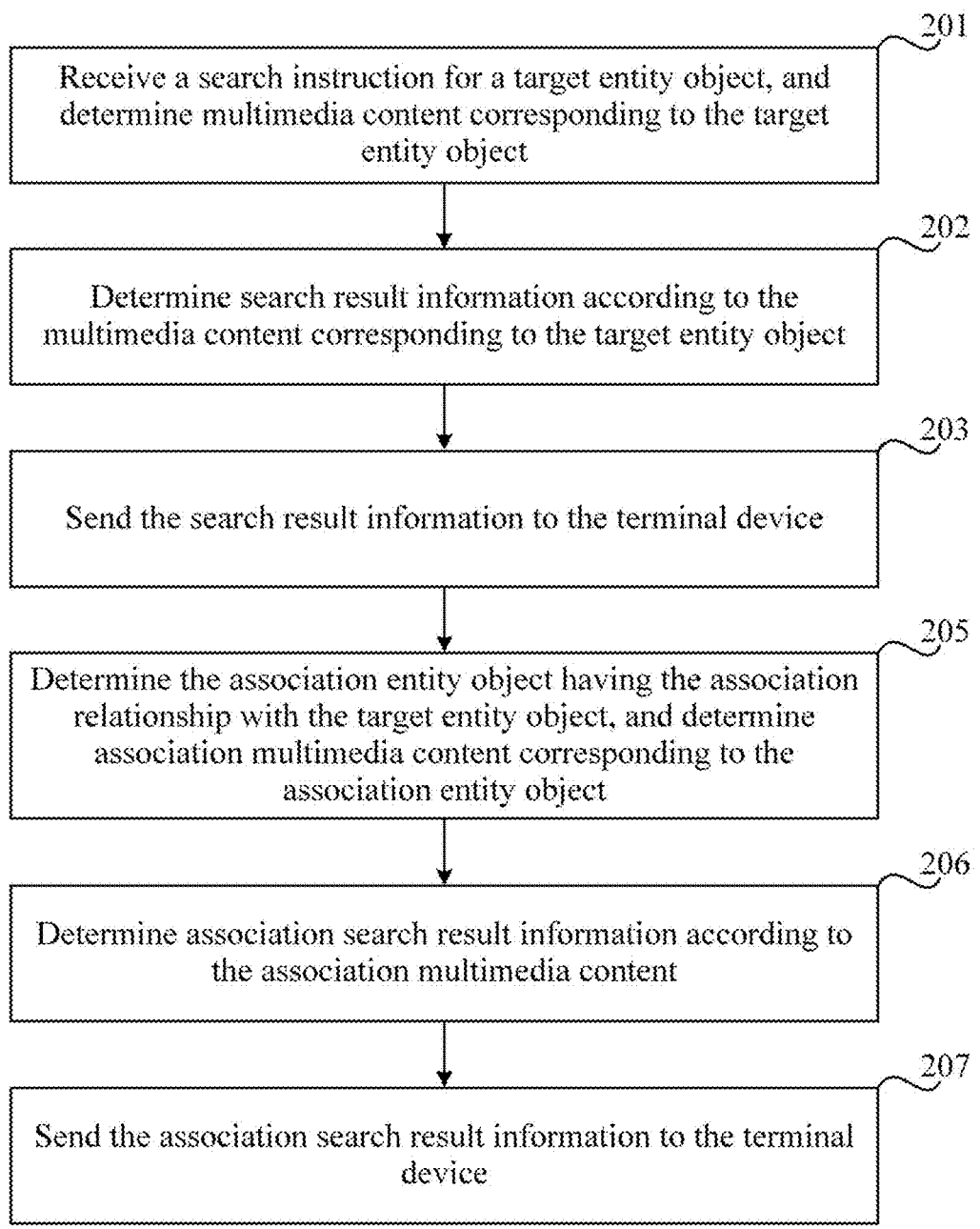
FIG. 13 is a flowchart of another search result presentation method according to an example embodiment.

FIG. 13 is a flowchart of another search result presentation method according to an example embodiment. As shown in FIG. 13, the method may further include steps described below.

In step 205, the association entity object having the association relationship with the target entity object is determined, and association multimedia content corresponding to the association entity object is determined.

In another application scene, after receiving the search instruction, the server analyzes the search instruction to obtain the search keyword included in the search instruction, thus determines the target entity object matching the search keyword, determines the association entity object having the association relationship with the target entity object, and then determines the association multimedia content corresponding to the association entity object. The association multimedia content may be understood as multimedia content using the association entity object, or multimedia content where the association entity object appears.

In step 206, association search result information is determined according to the association multimedia content, where the association search result information includes: at least one association multimedia resource for presenting the use effect of the association entity object, at least one group of association multimedia data or at least one piece of association resource indication information. The at least one group of association multimedia data includes image frame data using a tag of the association entity object in the association multimedia content, and the at least one piece of association resource indication information is used for indicating a clip where the association entity object appears in the association multimedia content.

In step 207, the association search result information is sent to the terminal device.

The server may determine the association search result information based on the association multimedia content corresponding to the association entity object, and send the association search result information to the terminal device. The association search result information may be classified into three types. The first type refers to at least one association multimedia resource for presenting the use effect of the association entity object, the second type refers to at least one group of association multimedia data, and the third type refers to at least one piece of association resource indication information. The manner for determining the association multimedia resource is the same as the manner for generating the multimedia resource for presenting the use effect of the target entity object, the manner for generating the association multimedia data is the same as the manner for generating the multimedia data corresponding to the target entity object, and the manner for generating the association resource indication information is the same as the manner for generating the resource indication information corresponding to the target entity object, which are not repeated here.

In this manner, the terminal device can acquire the multimedia resource for presenting the use effect of the target entity object according to the search result information, and acquire the association multimedia resource for presenting the use effect of the association entity object according to the association search result information. When the terminal device presents the multimedia resource and the association multimedia resource, the user can view the use effect of the target entity object through the multimedia resource and the use effect of the association entity object through the association multimedia resource, so that the effectiveness of the search is improved.

In summary, in the present disclosure, the search instruction for the target entity object is received, the multimedia content corresponding to the target entity object is determined, and the search result information is determined according to the multimedia content corresponding to the target entity object. The search result information may include at least one multimedia resource for presenting the use effect of the target entity object, at least one group of multimedia data or at least one piece of resource indication information. The search result information is sent to the terminal device. In the present disclosure, for search instructions for different target entity objects, search result information is determined according to multimedia content corresponding to a target entity object and sent to a terminal device, so that the terminal device can acquire a multimedia resource capable of presenting the use effect of a target entity object according to the search result information and present the multimedia resource without presenting the complete multimedia content. In this manner, the effectiveness of the search can be improved, and the consumption of data traffic can be reduced.

Figure 14:
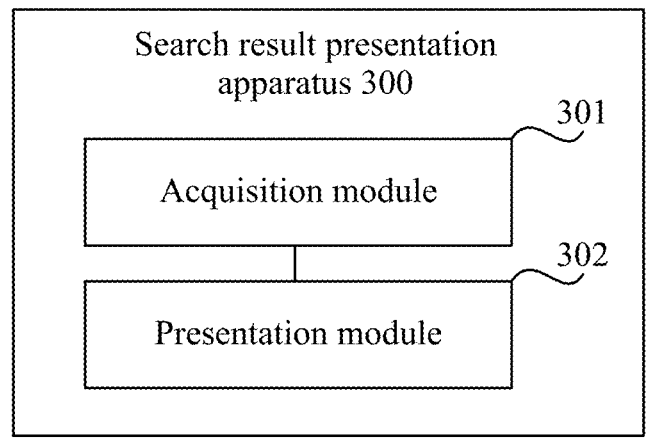
FIG. 14 is a block diagram of a search result presentation apparatus according to an example embodiment.

FIG. 14 is a block diagram of a search result presentation apparatus according to an example embodiment. As shown in FIG. 14, the apparatus 300 includes an acquisition module 301 and a presentation module 302.

The acquisition module 301 is configured to, in response to a search instruction for a target entity object, acquire at least one multimedia resource for presenting the use effect of the target entity object. The at least one multimedia resource is obtained based on multimedia content corresponding to the target entity object.

The presentation module 302 is configured to present the at least one multimedia resource.

In an application scene, the presentation module 302 may determine different presentation manners according to types of multimedia resources. For example, in a case where the multimedia resource is a video, the presentation module 302 presents the multimedia resource in a first preset manner, where the first preset manner includes any one of: playing repeatedly, playing in reverse order, playing at different speed and playing in a window. In a case where the multimedia resource is a dynamic image, the presentation module 302 presents the multimedia resource in a second preset manner, where the second preset manner includes: presenting after magnification or presenting after minimization.

Figure 15:
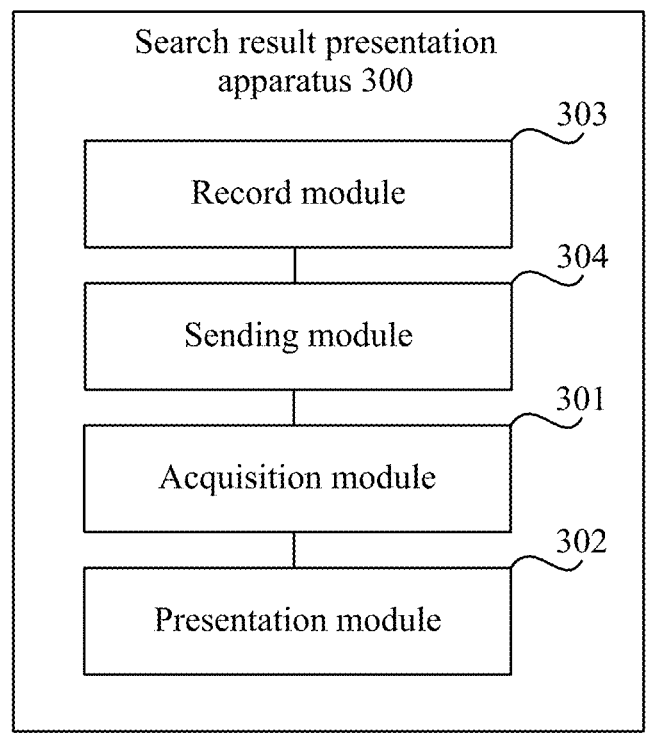
FIG. 15 is a block diagram of another search result presentation apparatus according to an example embodiment.

FIG. 15 is a block diagram of another search result presentation apparatus according to an example embodiment. As shown in FIG. 15, the apparatus 300 further includes a record module 303 and a sending module 304.

The record module 303 is configured to record at least one entity object used in the multimedia content and use time information of each entity object of the at least one entity object.

The sending module 304 is configured to send the multimedia content and attribute information of the multimedia content to a server. The attribute information of the multimedia content includes identification information of the each entity object and the use time information of the each entity object.

In an application scene, the acquisition module 301 may be configured to execute steps described below.

In step 1), multimedia data is acquired, where the multimedia data includes image frame data using the target entity object in the multimedia content corresponding to the target entity object.

In step 2), the at least one multimedia resource for presenting the use effect of the target entity object is generated based on the multimedia data.

In another application scene, the acquisition module 301 may be configured to execute steps described below.

In step 3), resource indication information corresponding to the target entity object is acquired, where the resource indication information is used for indicating a clip where the target entity object appears in the multimedia content.

In step 4), multimedia data is acquired according to the resource indication information, where the multimedia data includes image frame data using the target entity object in the multimedia content.

In step 5), the at least one multimedia resource for presenting the use effect of the target entity object is generated according to the multimedia data.

Figure 16:
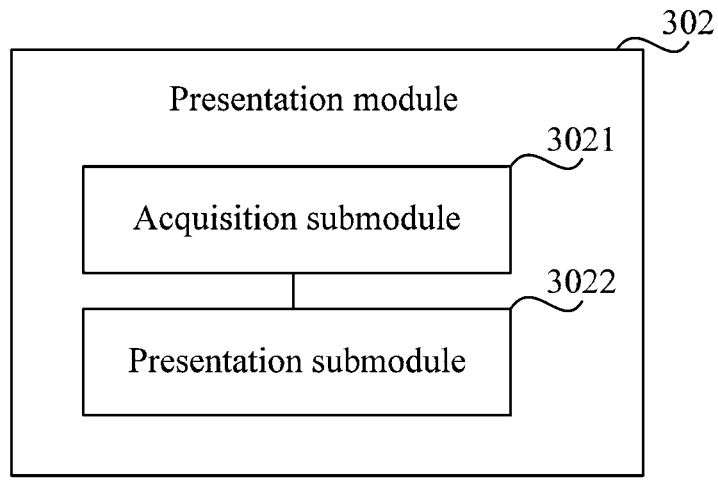
FIG. 16 is a block diagram of another search result presentation apparatus according to an example embodiment.

FIG. 16 is a block diagram of another search result presentation apparatus according to an example embodiment. As shown in FIG. 16, the presentation apparatus 302 may include an acquisition submodule 3021 and a presentation submodule 3022.

The acquisition submodule 3021 is configured to acquire an object identifier corresponding to the target entity object.

The presentation submodule 3022 is configured to display the object identifier corresponding to the target entity object in a first area of a presentation interface, and automatically play the at least one multimedia resource in a second area of the presentation interface.

Figure 17:
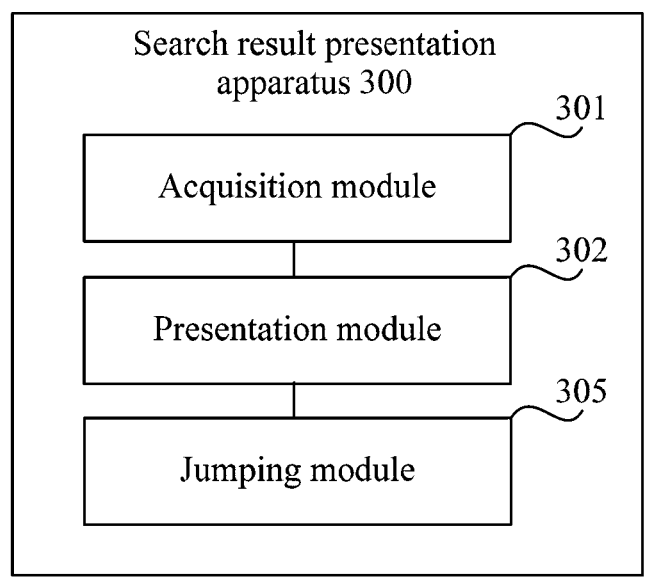
FIG. 17 is a block diagram of another search result presentation apparatus according to an example embodiment.

FIG. 17 is a block diagram of another search result presentation apparatus according to an example embodiment. As shown in FIG. 17, the apparatus 300 further includes a jumping module 305.

The jumping module 305 is configured to, in response to a triggering operation for the object identifier, jump to a multimedia shooting scene corresponding to the target entity object.

In an application scene, the acquisition module 301 may be configured to execute the step described below.

At least one multimedia resource for presenting the use effect of an entity object set is acquired, where the entity object set includes: the target entity object and an association entity object, where the association entity object is an entity object having an association relationship with the target entity object.

In another application scene, the acquisition module 301 may be configured to execute the step described below.

The at least one multimedia resource and an association multimedia resource for presenting the use effect of an association entity object are acquired, where the association entity object is an entity object having an association relationship with the target entity object.

The presentation module 302 may be configured to execute the step described below.

The at least one multimedia resource is presented in a third area of a presentation interface, and the association multimedia resource is presented in a fourth area of the presentation interface.

As for the apparatus in the preceding embodiments, manners for various modules executing operations have been described in the embodiments related to the method, which are not described here.

In summary, in the present disclosure, in response to the search instruction for the target entity object, at least one multimedia resource for presenting the use effect of the target entity object is acquired, where the at least one multimedia resource is obtained based on the multimedia content corresponding to the target entity object; and the at least one multimedia resource is presented. In the present disclosure, for search instructions for different target entity objects, a multimedia resource capable of presenting the use effect of a target entity object can be obtained according to corresponding multimedia content, and the multimedia resource is presented without presenting the complete multimedia content, so that the effectiveness of the search can be improved, and the consumption of data traffic can be reduced.

Figure 18:
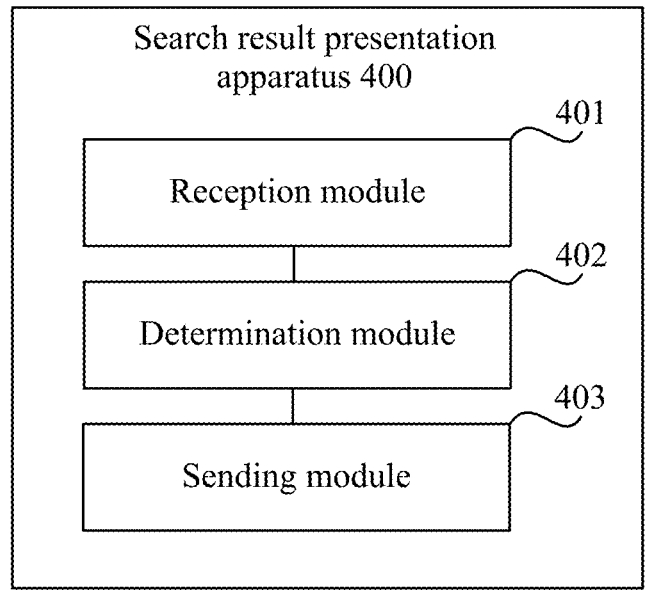
FIG. 18 is a block diagram of a search result presentation apparatus according to an example embodiment.

FIG. 18 is a block diagram of a search result presentation apparatus according to an example embodiment. As shown in FIG. 18, the apparatus 400 may be applied to a server and includes a reception module 401, a determination module 402 and a sending module 403.

The reception module 401 is configured to receive a search instruction for a target entity object, and determine multimedia content corresponding to the target entity object.

The determination module 402 is configured to determine search result information according to the multimedia content corresponding to the target entity object, where the search result information includes: at least one multimedia resource for presenting the use effect of the target entity object, at least one group of multimedia data or at least one piece of resource indication information. The at least one group of multimedia data is image frame data using a tag of the target entity object in the multimedia content, and the at least one piece of resource indication information is used for indicating a clip where the target entity object appears in the multimedia content.

The sending module 403 is configured to send the search result information to a terminal device.

In an application scene, the reception module 401 is further configured to receive multimedia content corresponding to any entity object and attribute information of multimedia content corresponding to each entity object of the any entity object. The attribute information includes identification information of the each entity object and use time information of the each entity object.

In another application scene, the determination module 402 may be configured to execute steps described below.

In step A), entity object information of the multimedia content is acquired. The entity object information includes: entity object identification information used in the multimedia content and a mapping relationship between the entity object identification information and image frame information, where the image frame information represents a clip where each entity object appears in the multimedia content.

In step B), target entity object identification information corresponding to the target entity object is selected from the entity object identification information, and image frame information of the target entity object is determined according to the mapping relationship.

In step C), the at least one multimedia resource is generated based on the multimedia content and the image frame information of the target entity object.

In another application scene, the determination module 402 may be configured to execute steps described below.

In step D), entity object information of the multimedia content is acquired. The entity object information includes: entity object identification information used in the multimedia content and a mapping relationship between the entity object identification information and image frame information, where the image frame information represents a clip where each entity object appears in the multimedia content.

In step E), target entity object identification information corresponding to the target entity object and association entity object identification information corresponding to an association entity object are selected from the entity object identification information, and image frame information of the target entity object and image frame information of the association entity object are determined according to the mapping relationship, where the association entity object is an entity object having an association relationship with the target entity object.

In step F), the at least one multimedia resource is generated based on the multimedia content, the image frame information of the target entity object and the image frame information of the association entity object.

In another application scene, the determination module 402 may further be configured to execute steps described below.

The association entity object having the association relationship with the target entity object is determined, and association multimedia content corresponding to the association entity object is determined. Association search result information is determined according to the association multimedia content, where the association search result information includes: at least one association multimedia resource for presenting the use effect of the association entity object, at least one group of association multimedia data or at least one piece of association resource indication information. The at least one group of association multimedia data includes image frame data using a tag of the association entity object in the association multimedia content, and the at least one piece of association resource indication information is used for indicating a clip where the association entity object appears in the association multimedia content.

The sending module 403 may further be configured to execute the step described below.

The association search result information is sent to the terminal device.

As for the apparatus in the preceding embodiments, manners for various modules executing operations have been described in the embodiments related to the method, which are not described here.

In summary, in the present disclosure, the search instruction for the target entity object is received, the multimedia content corresponding to the target entity object is determined, and the search result information is determined according to the multimedia content corresponding to the target entity object. The search result information may include at least one multimedia resource for presenting the use effect of the target entity object, at least one group of multimedia data or at least one piece of resource indication information. The search result information is sent to the terminal device. In the present disclosure, for search instructions for different target entity objects, search result information is determined according to corresponding multimedia content and sent to a terminal device, so that the terminal device can acquire a multimedia resource capable of presenting the use effect of a target entity object according to the search result information and present the multimedia resource without presenting the complete multimedia content. In this manner, the effectiveness of the search can be improved, and the consumption of data traffic can be reduced.

Figure 19:
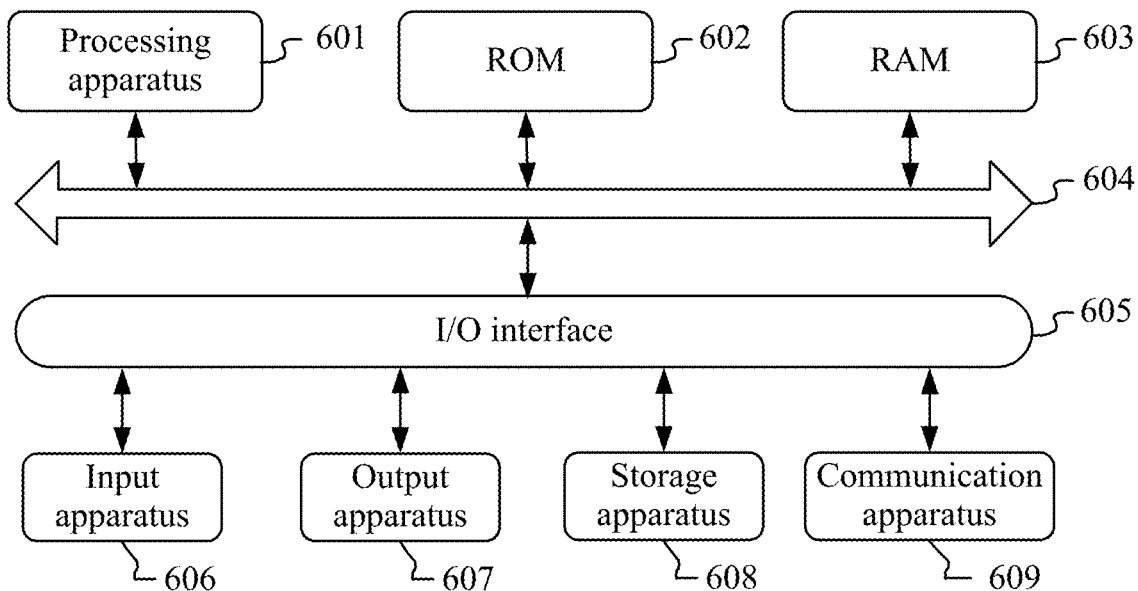
FIG. 19 is a block diagram of a terminal device according to an example embodiment.

Referring to FIG. 19, FIG. 19 shows the structural diagram of a terminal device 600 (such as the terminal device or server in FIG. 1) applicable to implementing an embodiment of the present disclosure. The terminal device in the embodiments of the present disclosure may include, but is not limited to, mobile terminals such as a mobile phone, a laptop, a digital broadcast receiver, a PDA, a Pad, a PMP and an in-vehicle terminal (such as an in-vehicle navigation terminal), and stationary terminals such as a digital TV and a desktop computer. The terminal device shown in FIG. 19 is merely an example and should not impose any limitation to the function and usage scope of the embodiments of the present disclosure.

As shown in FIG. 19, the terminal device 600 may include a processing apparatus 601 (such as a central processing unit and a graphics processing unit). The processing apparatus 601 may perform various appropriate actions and processing according to a program stored in a read-only memory (ROM) 602 or a program loaded into a random-access memory (RAM) 603 from a storage apparatus 608. The RAM 603 also stores various programs and data required for the operation of the terminal device 600. The processing apparatus 601, the ROM 602, and the RAM 603 are connected to each other via a bus 604. An input/output (I/O) interface 605 is also connected to the bus 604.

The following apparatus may be connected to the I/O interface 605: an input apparatus 606 such as a touch screen, a touch pad, a keyboard, a mouse, a camera, a microphone, an accelerometer and a gyroscope, an output apparatus 607 such as a liquid crystal display (LCD), a speaker and a vibrator, the storage apparatus 608 such as a magnetic tape and a hard disk, and a communication apparatus 609. The communication apparatus 609 may allow the terminal device 600 to perform wireless or wired communication with other devices to exchange data. FIG. 19 shows the terminal device 600 having various apparatuses, but not all the apparatuses shown herein need to be implemented or present. Alternatively, more or fewer apparatuses may be implemented.

According to the embodiments of the present disclosure, the process described above with reference to a flowchart may be implemented as a computer software program. For example, a computer program product is included in the embodiments of the present disclosure. The computer program product includes a computer program carried in a non-transitory computer-readable medium. The computer program includes program codes for executing the method shown in the flowchart. In such embodiments, the computer program may be downloaded and installed from a network through the communication apparatus 609, installed from the storage apparatus 608, or installed from the ROM 602. When the computer program is executed by the processing apparatus 601, the preceding functions defined in the method in the embodiments of the present disclosure are implemented.

The computer-readable medium described above in the present disclosure may be a computer-readable signal medium or a computer-readable storage medium or any combination thereof. For example, the computer-readable storage medium may be, but is not limited to, an electrical, magnetic, optical, electromagnetic, infrared or semiconductor system, apparatus, or device or any combination thereof. The computer-readable storage medium may include, but is not limited to, an electrical connection having one or more wires, a portable computer magnetic disk, a hard disk, a RAM, a ROM, an erasable programmable read-only memory (EPROM), a flash memory, an optical fiber, a portable compact disc read-only memory (CD-ROM), an optical storage device, a magnetic storage device, or any suitable combination thereof. In the present disclosure, the computer-readable storage medium may be any tangible medium including or storing a program. The program may be used by or used in conjunction with an instruction execution system, apparatus or device. In the present disclosure, the computer-readable signal medium may include a data signal propagated on a baseband or as a part of a carrier, and computer-readable program codes are carried in the data signal. The data signal propagated in this manner may be in multiple forms and includes, but is not limited to, an electromagnetic signal, an optical signal or any suitable combination thereof. The computer-readable signal medium may further be any computer-readable medium other than the computer-readable storage medium. The computer-readable signal medium may send, propagate or transmit a program used by or used in conjunction with an instruction execution system, apparatus or device. The program codes included on the computer-readable medium may be transmitted by any suitable medium, including, but not limited to, a wire, an optical cable, a radio frequency (RF) or any suitable combination thereof.

In some embodiments, terminal devices and servers may communicate using any network protocol currently known or to be developed in the future, such as HyperText Transfer Protocol (HTTP), and may be interconnected with any form or medium of digital data communication (such as a communication network). Examples of the communication network include a local area network (LAN), a wide area network (WAN), an inter-network (for example, the Internet), a peer-to-peer network (for example, an ad hoc network), and any network currently known or to be developed in the future.

The computer-readable medium may be included in the terminal device or may exist alone without being assembled into the terminal device.

The computer-readable medium carries one or more programs which, when executed by the terminal device, cause the terminal device to: in response to a search instruction for a target entity object, acquire at least one multimedia resource for presenting the use effect of the target entity object, where the at least one multimedia resource is obtained based on multimedia content corresponding to the target entity object; and present the at least one multimedia resource.

Alternatively, the computer-readable medium carries one or more programs which, when executed by the terminal device, cause the terminal device to: receive a search instruction for a target entity object, and determine multimedia content corresponding to the target entity object; determine search result information according to the multimedia content corresponding to the target entity object, where the search result information includes: at least one multimedia resource for presenting the use effect of the target entity object, at least one group of multimedia data or at least one piece of resource indication information, where the at least one group of multimedia data is image frame data using a tag of the target entity object in the multimedia content, and the at least one piece of resource indication information is used for indicating a clip where the target entity object appears in the multimedia content; and send the search result information to a terminal device.

Computer program codes for executing operations in the present disclosure may be written in one or more programming languages or a combination thereof. The preceding programming languages include, but are not limited to, object-oriented programming languages such as Java, Smalltalk, and C++ and may also include conventional procedural programming languages such as C or similar programming languages. Program codes may be executed entirely on a user computer, executed partly on a user computer, executed as a stand-alone software package, executed partly on a user computer and partly on a remote computer, or executed entirely on a remote computer or a server. In the case involving the remote computer, the remote computer may be connected to the user computer through any type of network including a LAN or a WAN, or may be connected to an external computer (for example, via the Internet through an Internet service provider).

The flowcharts and block diagrams in the drawings show possible architectures, functions and operations of the system, method and computer program product according to multiple embodiments of the present disclosure. In this regard, each block in the flowcharts or block diagrams may represent a module, a program segment or part of codes that contains one or more executable instructions for implementing specified logical functions. In some alternative implementations, the functions marked in the blocks may occur in an order different from that marked in the drawings. For example, two successive blocks may, in fact, be executed substantially in parallel or in reverse order, which depends on the functions involved. It is also to be noted that each block in the block diagrams and/or flowcharts and a combination of blocks in the block diagrams and/or flowcharts may be implemented by a special-purpose hardware-based system executing a specified function or operation or may be implemented by a combination of special-purpose hardware and computer instructions.

The described modules involved in the embodiments of the present disclosure may be implemented in software or in hardware. The names of the modules do not constitute a limitation on the modules themselves. For example, an acquisition module may also be described as "a module for acquiring a multimedia resource".

The functions described above herein may be executed, at least partially, by one or more hardware logic components. For example, without limitation, example types of hardware logic components that can be used include a field-programmable gate array (FPGA), an application-specific integrated circuit (ASIC), an application specific standard product (ASSP), a system-on-chip (SoC), a complex programmable logic device (CPLD) and the like.

In the context of the present disclosure, a machine-readable medium may be a tangible medium that may include or store a program that is used by or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. The machine-readable storage medium includes an electrical connection based on one or more wires, a portable computer disk, a hard disk, a RAM, a ROM, an EPROM, a flash memory, an optical fiber, a portable CD-ROM, an optical storage device, a magnetic storage device, or any suitable combination thereof.

According to one or more embodiments of the present disclosure, example 1 provides a search result presentation method. The method includes steps described below. In response to a search instruction for a target entity object, at least one multimedia resource for presenting the use effect of the target entity object is acquired, where the at least one multimedia resource is obtained based on multimedia content corresponding to the target entity object; and the at least one multimedia resource is presented.

According to one or more embodiments of the present disclosure, example 2 provides the method of example 1, and the method further includes steps described below. At least one entity object used in the multimedia content and use time information of each entity object of the at least one entity object are recorded; and the multimedia content and attribute information of the multimedia content are sent to a server, where the attribute information of the multimedia content includes identification information of the each entity object and the use time information of the each entity object.

According to one or more embodiments of the present disclosure, example 3 provides the method of example 1, and the step in which the at least one multimedia resource for presenting the use effect of the target entity object is acquired includes steps described below. Multimedia data is acquired, where the multimedia data includes image frame data using the target entity object in the multimedia content corresponding to the target entity object; and the at least one multimedia resource for presenting the use effect of the target entity object is generated based on the multimedia data.

According to one or more embodiments of the present disclosure, example 4 provides the method of example 1, and the step in which the at least one multimedia resource for presenting the use effect of the target entity object is acquired includes steps described below. Resource indication information corresponding to the target entity object is acquired, where the resource indication information is used for indicating a clip where the target entity object appears in the multimedia content; multimedia data is acquired according to the resource indication information, where the multimedia data includes image frame data using the target entity object in the multimedia content; and the at least one multimedia resource for presenting the use effect of the target entity object is generated according to the multimedia data.

According to one or more embodiments of the present disclosure, example 5 provides the method of any one of example 1 to example 4, and the step in which the at least one multimedia resource is presented includes steps described below. An object identifier corresponding to the target entity object is acquired; and the object identifier corresponding to the target entity object is displayed in a first area of a presentation interface, and the at least one multimedia resource is automatically played in a second area of the presentation interface.

According to one or more embodiments of the present disclosure, example 6 provides the method of example 5, and the method further includes the step described below. In response to a triggering operation for the object identifier, a multimedia shooting scene corresponding to the target entity object is jumped to.

According to one or more embodiments of the present disclosure, example 7 provides the method of any one of example 1 to example 4, and the step in which the at least one multimedia resource for presenting the use effect of the target entity object is acquired includes the step described below. At least one multimedia resource for presenting the use effect of an entity object set is acquired, where the entity object set includes: the target entity object and an association entity object, where the association entity object is an entity object having an association relationship with the target entity object.

According to one or more embodiments of the present disclosure, example 8 provides the method of any one of example 1 to example 4. The step in which the at least one multimedia resource for presenting the use effect of the target entity object is acquired includes the step described below. The at least one multimedia resource and an association multimedia resource for presenting the use effect of an association entity object are acquired, where the association entity object is an entity object having an association relationship with the target entity object. The step in which the at least one multimedia resource is presented includes the step described below. The at least one multimedia resource is presented in a third area of a presentation interface, and the association multimedia resource is presented in a fourth area of the presentation interface.

According to one or more embodiments of the present disclosure, example 9 provides the method of any one of example 1 to example 4, and the step in which the at least one multimedia resource is presented includes steps described below. In a case where the at least one multimedia resource is a video, the at least one multimedia resource is presented in a first preset manner, where the first preset manner includes any one of: playing repeatedly, playing in reverse order, playing at different speed and playing in a window; in a case where the at least one multimedia resource is a dynamic image, the at least one multimedia resource is presented in a second preset manner, where the second preset manner includes: presenting after magnification or presenting after minimization.

According to one or more embodiments of the present disclosure, example 10 provides a search result presentation method. The method includes steps described below. A search instruction for a target entity object is received, and multimedia content corresponding to the target entity object is determined; search result information is determined according to the multimedia content corresponding to the target entity object, where the search result information includes: at least one multimedia resource for presenting the use effect of the target entity object, at least one group of multimedia data or at least one piece of resource indication information, where the at least one group of multimedia data is image frame data using a tag of the target entity object in the multimedia content, and the at least one piece of resource indication information is used for indicating a clip where the target entity object appears in the multimedia content; and the search result information is sent to a terminal device.

According to one or more embodiments of the present disclosure, example 11 provides the method of example 10, and the method further includes the step described below. Multimedia content corresponding to any entity object and attribute information of multimedia content corresponding to each entity object of the any entity object are received, where the attribute information includes identification information of the each entity object and use time information of the each entity object.

According to one or more embodiments of the present disclosure, example 12 provides the method of example 10, and the step in which the search result information is determined according to the multimedia content corresponding to the target entity object includes steps described below. Entity object information of the multimedia content is acquired, where the entity object information includes: entity object identification information used in the multimedia content and a mapping relationship between the entity object identification information and image frame information, where the image frame information represents a clip where each entity object appears in the multimedia content; target entity object identification information corresponding to the target entity object is selected from the entity object identification information, and image frame information of the target entity object is determined according to the mapping relationship; and the at least one multimedia resource is generated based on the multimedia content and the image frame information of the target entity object.

According to one or more embodiments of the present disclosure, example 13 provides the method of example 10, and the step in which the search result information is determined according to the multimedia content corresponding to the target entity object includes steps described below. Entity object information of the multimedia content is acquired, where the entity object information includes: entity object identification information used in the multimedia content and a mapping relationship between the entity object identification information and image frame information, where the image frame information represents a clip where each entity object appears in the multimedia content; target entity object identification information corresponding to the target entity object and association entity object identification information corresponding to an association entity object are selected from the entity object identification information, and image frame information of the target entity object and image frame information of the association entity object are determined according to the mapping relationship, where the association entity object is an entity object having an association relationship with the target entity object; and the at least one multimedia resource is generated based on the multimedia content, the image frame information of the target entity object and the image frame information of the association entity object.

According to one or more embodiments of the present disclosure, example 14 provides the method of any one of example 10 to example 13, and after the search instruction for the target entity object is received, the method further includes steps described below. The association entity object having the association relationship with the target entity object is determined, and association multimedia content corresponding to the association entity object is determined; association search result information is determined according to the association multimedia content, where the association search result information includes: at least one association multimedia resource for presenting the use effect of the association entity object, at least one group of association multimedia data or at least one piece of association resource indication information, where the at least one group of association multimedia data includes image frame data using a tag of the association entity object in the association multimedia content, and the at least one piece of association resource indication information is used for indicating a clip where the association entity object appears in the association multimedia content; and the association search result information is sent to a terminal device.

According to one or more embodiments of the present disclosure, example 15 provides a search result presentation apparatus. The apparatus includes an acquisition module and a presentation module. The acquisition module is configured to, in response to a search instruction for a target entity object, acquire at least one multimedia resource for presenting the use effect of the target entity object, where the at least one multimedia resource is obtained based on multimedia content corresponding to the target entity object; and the presentation module is configured to present the at least one multimedia resource.

According to one or more embodiments of the present disclosure, example 16 provides a search result presentation apparatus. The apparatus includes a reception module, a determination module and a sending module. The reception module is configured to receive a search instruction for a target entity object, and determine multimedia content corresponding to the target entity object; the determination module is configured to determine search result information according to the multimedia content corresponding to the target entity object, where the search result information includes: at least one multimedia resource for presenting the use effect of the target entity object, at least one group of multimedia data or at least one piece of resource indication information, where the at least one group of multimedia data is image frame data using a tag of the target entity object in the multimedia content, and the at least one piece of resource indication information is used for indicating a clip where the target entity object appears in the multimedia content; and the sending module is configured to send the search result information to a terminal device.

According to one or more embodiments of the present disclosure, example 17 provides a computer-readable medium configured to store a computer program. The computer program, when executed by a processing apparatus, implements the method of any one of example 1 to example 9 or the method of any one of example 10 to example 14.

According to one or more embodiments of the present disclosure, example 18 provides a terminal device. The terminal device includes a storage apparatus and a processing apparatus. The storage apparatus is configured to store a computer program, and the processing apparatus is configured to execute the computer program in the storage apparatus to implement the method of any one of example 1 to example 9 or the method of any one of example 10 to example 14.

In addition, although multiple operations are depicted in a particular order, this should not be construed as requiring that such operations should be performed in the shown particular order or in a sequential order. In certain circumstances, multitasking and parallel processing may be advantageous. Similarly, although implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments individually or in any suitable sub-combination.

What is claimed is:

1. A search result presentation method, comprising:
   sending, by a terminal device, a search instruction for a target entity object to a server, wherein the search instruction comprises a search keyword corresponding to the target entity object, and the target entity object is at least one of a content entity object and an operation entity object, the content entity object is used for indicating a content comprised in an image frame in a multimedia content, the operation entity object is used for indicating an operation comprised in the image frame in the multimedia content;
   receiving, by the terminal device, a search result information determined by the server according to the search instruction, wherein the search result information comprises: at least one multimedia resource for presenting a use effect of the target entity object, at least one group of multimedia data, or, at least one piece of resource indication information, wherein the at least one group of multimedia data is image frame data using a tag of the target entity object in the multimedia content, and the at least one piece of resource indication information is used for indicating a clip where the target entity object appears in the multimedia content;
   acquiring, by the terminal device, the at least one multimedia resource according to the search result information for presenting a use effect of the target entity object, wherein the at least one multimedia resource is a dynamic image or a video clip obtained based on the multimedia content corresponding to the target entity object, the at least one multimedia resource is a part of the multimedia content, and the at least one multimedia resource is directly obtained from the at least one multimedia resource for presenting a use effect of the target entity object comprised in the search result information, or is generated according to the at least one group of multimedia data or the at least one piece of resource indication information comprised in the search result information; and
   presenting, by the terminal device, the at least one multimedia resource on a presentation interface of the terminal device.

2. The method according to claim 1, further comprising:
   recording, by the terminal device, at least one entity object used in the multimedia content and use time information of each entity object of the at least one entity object; and
   sending, by the terminal device, the multimedia content and attribute information of the multimedia content to the server, wherein the attribute information of the multimedia content comprises identification information of each entity object and the use time information of each entity object.

3. The method according to claim 1, wherein when the search result information comprises the at least one group of multimedia data, acquiring, by the terminal device, the at least one multimedia resource according to the search result information for presenting the use effect of the target entity object comprises:
   acquiring, by the terminal device, the at least one group of multimedia data, wherein the at least one group of multimedia data comprises image frame data, which use the target entity object, in the multimedia content; and
   generating, by the terminal device, according to the at least one group of multimedia data, the at least one multimedia resource for presenting the use effect of the target entity object.

4. The method according to claim 1, wherein when the search result information comprises the at least one piece of resource indication information, acquiring, by the terminal device, the at least one multimedia resource for presenting the use effect of the target entity object comprises:
   acquiring, by the terminal device, the at least one piece of resource indication information corresponding to the target entity object, wherein the at least one piece of resource indication information is used for indicating a clip where the target entity object appears in the multimedia content;
   acquiring, by the terminal device, multimedia data according to the at least one piece of resource indication information, wherein the multimedia data comprises image frame data, which use the target entity object, in the multimedia content; and
   generating, by the terminal device, according to the multimedia data, the at least one multimedia resource for presenting the use effect of the target entity object.

5. The method according to claim 1, wherein presenting, by the terminal device, the at least one multimedia resource on the presentation interface of the terminal device comprises:
   acquiring, by the terminal device, an object identifier corresponding to the target entity object; and
   displaying, by the terminal device, the object identifier in a first area of the presentation interface, and automatically playing the at least one multimedia resource in a second area of the presentation interface.

6. The method according to claim 5, further comprising:
   in response to a triggering operation for the object identifier, by the terminal device, jumping to a multimedia shooting scene corresponding to the target entity object.

7. The method according to claim 1, wherein acquiring, by the terminal device, the at least one multimedia resource according to the search result information for presenting the use effect of the target entity object comprises:

acquiring, by the terminal device, at least one multimedia resource for presenting a use effect of an entity object set, wherein the entity object set comprises the target entity object and an association entity object, wherein the association entity object is an entity object having an association relationship with the target entity object.

8. The method according to claim 1, wherein when the search result information comprises the at least one multimedia resource for presenting the use effect of the target entity object, acquiring, by the terminal device, the at least one multimedia resource according to the search result information for presenting the use effect of the target entity object comprises:

acquiring, by the terminal device, the at least one multimedia resource and an association multimedia resource for presenting a use effect of an association entity object, wherein the association entity object is an entity object having an association relationship with the target entity object; and presenting, by the terminal device, the at least one multimedia resource comprises: presenting the at least one multimedia resource in a third area of a presentation interface, and presenting the association multimedia resource in a fourth area of the presentation interface.

9. The method according to claim 1, wherein presenting, by the terminal device, the at least one multimedia resource on the presentation interface of the terminal device comprises:

in a case where the at least one multimedia resource is a video, presenting, by the terminal device, the at least one multimedia resource in a first preset manner on the presentation interface of the terminal device, wherein the first preset manner comprises any one of: playing repeatedly, playing in reverse order, playing at different speed and playing in a window;

in a case where the at least one multimedia resource is a dynamic image, presenting, by the terminal device, the at least one multimedia resource in a second preset manner on the presentation interface of the terminal device, wherein the second preset manner comprises: presenting after magnification or presenting after minimization.

10. The method according to claim 1, after receiving, by the server, the search instruction for the target entity object sent by the terminal device, further comprising:

determining, by the server, the association entity object having the association relationship with the target entity object, and determining association multimedia content corresponding to the association entity object;

determining, by the server, association search result information according to the association multimedia content, wherein the association search result information comprises: at least one association multimedia resource for presenting a use effect of the association entity object, at least one group of association multimedia data or at least one piece of association resource indication information, wherein the at least one group of association multimedia data comprises image frame data using a tag of the association entity object in the association multimedia content, and the at least one piece of association resource indication information is used for indicating a clip where the association entity object appears in the association multimedia content; and sending, by the server, the association search result information to the terminal device.

11. A non-transitory computer-readable medium configured to store a computer program which, when executed by a processing apparatus, implements the method according to claim 1.

12. A search result presentation method, comprising:

receiving, by a server, a search instruction for a target entity object sent by a terminal device, wherein the search instruction comprises a search keyword corresponding to the target entity object, and determining multimedia content corresponding to the target entity object according to the search keyword corresponding to the target entity object comprised in the search instruction, wherein the target entity object is at least one of a content entity object and an operation entity object, the content entity object is used for indicating a content comprised in an image frame in the multimedia content, the operation entity object is used for indicating an operation comprised in the image frame in the multimedia content;

determining, by the server, search result information according to the multimedia content corresponding to the target entity object, wherein the search result information comprises: at least one multimedia resource for presenting a use effect of the target entity object, at least one group of multimedia data, or, at least one piece of resource indication information, wherein the at least one group of multimedia data is image frame data using a tag of the target entity object in the multimedia content, and the at least one piece of resource indication information is used for indicating a clip where the target entity object appears in the multimedia content, wherein the at least one multimedia resource is a dynamic image or a video clip obtained based on the multimedia content corresponding to the target entity object, the at least one multimedia resource is a part of the multimedia content, the at least one set of multimedia data and the at least one resource indication are used for generating the at least one multimedia resource by the terminal device; and sending, by the server, the search result information to the terminal device.

13. The method according to claim 12, further comprising:

receiving, by the server, the multimedia content corresponding to any entity object and attribute information of the multimedia content corresponding to each entity object of the any entity object, wherein the attribute information comprises identification information of the each entity object and use time information of the each entity object.

14. The method according to claim 12, wherein determining, by the server, the search result information according to the multimedia content corresponding to the target entity object comprises:

acquiring, by the server, entity object information of the multimedia content, wherein the entity object information comprises: entity object identification information used in the multimedia content and a mapping relationship between the entity object identification information and image frame information, wherein the image frame information represents a clip where each entity object appears in the multimedia content;

selecting, by the server, target entity object identification information corresponding to the target entity object from the entity object identification information, and determining image frame information of the target entity object according to the mapping relationship; and generating, by the server, the at least one multimedia resource based on the multimedia content and the image frame information of the target entity object.

15. The method according to claim 12, wherein determining, by the server, the search result information according to the multimedia content corresponding to the target entity object comprises:

acquiring, by the server, entity object information of the multimedia content, wherein the entity object information comprises: entity object identification information used in the multimedia content and a mapping relationship between the entity object identification information and image frame information, wherein the image frame information represents a clip where each entity object appears in the multimedia content;

selecting, by the server, target entity object identification information corresponding to the target entity object and association entity object identification information corresponding to an association entity object from the entity object identification information, and determining image frame information of the target entity object and image frame information of the association entity object according to the mapping relationship, wherein the association entity object is an entity object having an association relationship with the target entity object; and generating, by the server, the at least one multimedia resource based on the multimedia content, the image frame information of the target entity object and the image frame information of the association entity object.

16. A non-transitory computer-readable medium configured to store a computer program which, when executed by a processing apparatus, implements the method according to claim 12.

17. A terminal device, comprising:

a storage apparatus configured to store a computer program; and a processing apparatus configured to execute the computer program in the storage apparatus to implement:

sending a search instruction for a target entity object to a server, wherein the search instruction comprises a search keyword corresponding to the target entity object, and the target entity object is at least one of a content entity object and an operation entity object, the content entity object is used for indicating a content comprised in an image frame in a multimedia content, the operation entity object is used for indicating an operation comprised in the image frame in the multimedia content;

receiving a search result information determined by the server according to the search instruction, wherein the search result information comprises: at least one multimedia resource for presenting a use effect of the target entity object, at least one group of multimedia data, or, at least one piece of resource indication information, wherein the at least one group of multimedia data is image frame data using a tag of the target entity object in the multimedia content, and the at least one piece of resource indication information is used for indicating a clip where the target entity object appears in the multimedia content;

acquiring the at least one multimedia resource according to the search result information for presenting a use effect of the target entity object, wherein the at least one multimedia resource is a dynamic image or a video clip obtained based on the multimedia content corresponding to the target entity object, the at least one multimedia resource is a part of the multimedia content, and the at least one multimedia resource is directly obtained from the at least one multimedia resource for presenting a use effect of the target entity object comprised in the search result information, or is generated according to the at least one group of multimedia data or the at least one piece of resource indication information comprised in the search result information; and presenting the at least one multimedia resource on a presentation interface of the terminal device.

18. A server, comprising:

a storage apparatus configured to store a computer program; and a processing apparatus configured to execute the computer program in the storage apparatus to implement the method according to claim 12.

* * * * *